US010654955B2

(12) United States Patent
Osby et al.

(10) Patent No.: US 10,654,955 B2
(45) Date of Patent: May 19, 2020

(54) ETHYLENE-BASED POLYMERS COMPRISING UNITS DERIVED FROM CARBON MONOXIDE AND A RHEOLOGY MODIFYING AGENT

(71) Applicant: Dow Global Technologies LLC, Midland, MI (US)

(72) Inventors: John O. Osby, Lake Jackson, TX (US); Teresa P. Karjala, Lake Jackson, TX (US); Otto J. Berbee, Hulst (NL); James L. Cooper, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 447 days.

(21) Appl. No.: 15/311,452

(22) PCT Filed: Jun. 24, 2015

(86) PCT No.: PCT/US2015/037324
§ 371 (c)(1),
(2) Date: Nov. 15, 2016

(87) PCT Pub. No.: WO2015/200426
PCT Pub. Date: Dec. 30, 2015

(65) Prior Publication Data
US 2017/0107315 A1    Apr. 20, 2017

Related U.S. Application Data

(60) Provisional application No. 62/018,014, filed on Jun. 27, 2014.

(51) Int. Cl.
*C08F 210/02*    (2006.01)
*C08G 67/02*    (2006.01)
(Continued)

(52) U.S. Cl.
CPC ............ *C08F 210/02* (2013.01); *C08G 67/02* (2013.01); *C08L 23/0869* (2013.01);
(Continued)

(58) Field of Classification Search
CPC ............................. C08F 210/18; C08F 210/02
(Continued)

(56) References Cited

U.S. PATENT DOCUMENTS 2,495,286 A    1/1950  Brubaker
3,334,081 A    8/1967  Madgwick et al.
(Continued)

FOREIGN PATENT DOCUMENTS

CN    102753615 A    10/2012
EP    0230143 A1    7/1987
(Continued)

OTHER PUBLICATIONS

Office Action pertaining to corresponding Chinese Patent Application No. 201580033183.X, dated Jun. 19, 2019.
(Continued)

*Primary Examiner* — Duc Truong
(74) *Attorney, Agent, or Firm* — Dinsmore & Shohl LLP

(57) ABSTRACT

The invention provides a composition comprising an ethylene-based polymer, comprising at least the following: A) a unit derived from Carbon Monoxide (CO); and B) a unit derived from at least one Rheology Modifying Agent (RMA) selected from the following RMA1, RMA2, RMA3, RMA4, RMA5, each as described herein, or a combination thereof.

20 Claims, 3 Drawing Sheets

(51) Int. Cl.
*C08L 23/08* (2006.01)
*C09D 123/08* (2006.01)
*C08G 65/332* (2006.01)

(52) U.S. Cl.
CPC .... *C09D 123/0869* (2013.01); *C08F 2500/02* (2013.01); *C08F 2500/11* (2013.01); *C08G 65/3322* (2013.01); *C08L 2205/025* (2013.01)

(58) Field of Classification Search
USPC ..................................................... 528/392
See application file for complete search history.

(56) References Cited

U.S. PATENT DOCUMENTS

| | | |
|---|---|---|
| 3,676,401 A | 7/1972 | Henry |
| 3,780,140 A | 12/1973 | Hammer |
| 3,860,538 A | 1/1975 | Guillet et al. |
| 4,714,741 A | 12/1987 | Balduff et al. |
| 4,861,675 A | 8/1989 | George |
| 4,940,775 A | 7/1990 | Drent |
| 4,962,164 A | 10/1990 | Jabarin et al. |
| 5,178,960 A | 1/1993 | Cook |
| 5,210,176 A | 5/1993 | Drent |
| 5,281,681 A | 1/1994 | Austin |
| 5,334,700 A | 8/1994 | Austin |
| 6,037,443 A | 3/2000 | Muller et al. |
| 6,407,191 B1 | 6/2002 | Mezquita et al. |
| 6,558,809 B1 | 5/2003 | Kelch et al. |
| 2008/0242809 A1 | 10/2008 | Neuteboom et al. |
| 2013/0237678 A1 | 9/2013 | Osby et al. |
| 2016/0297904 A1 | 10/2016 | Berbee et al. |
| 2016/0304643 A1 | 10/2016 | Eddy et al. |

FOREIGN PATENT DOCUMENTS

| | | |
|---|---|---|
| GB | 1448062 A | 9/1976 |
| WO | 1991/18944 A1 | 12/1991 |
| WO | 1992/012185 A2 | 7/1992 |
| WO | 1997/45465 A1 | 12/1997 |
| WO | 2007/110127 A1 | 10/2007 |
| WO | 2011/071843 A1 | 6/2011 |
| WO | 2012/057975 A1 | 5/2012 |
| WO | 2012/084787 A1 | 6/2012 |
| WO | 2013/095969 A1 | 6/2013 |
| WO | 2014/003837 A1 | 1/2014 |
| WO | 2014/105608 A1 | 7/2014 |
| WO | 2006/094723 A1 | 9/2016 |

OTHER PUBLICATIONS

Ward, R.M., et al., Ethylene-Carbon Monoxide Extrudable Adhesive Copolymers for Polyvinylidene Chloride, Tappi Journal, Jun. 1988, pp. 140-144.
Scott, Gerald., et al., Degradable Polymers, Principles and Applications, Chapter 8: Ethylene-carbon monoxide copolymers,1995, pp. 156-168, Chapman and Hall.
PCT/ US2015/037324,; International Search Report, dated Sep. 16, 2015.
PCT/ US2015/037324, International Preliminary Report on Patentability, dated Jan. 5, 2017.
PCT/ US2015/037324,; Written Opinion of the International Searching Authority, dated Sep. 16, 2015.
First Office Action issued by the Chinese Patent Office in the matter corresponding to Chinese Patent Application No. 201580033183.X dated Nov. 15, 2018.
Japanese Office Action issued by the Japan Patent Office for Japanese Application No. 2016-574364 dated Feb. 26, 2019 (4 pages).
EP15742145.4; Communication pursuant to Article 94(3) EPC dated Sep. 7, 2018, 7 Pages.
Office Action pertaining to corresponding Chinese Patent Application No. 201580033183.X, dated Oct. 23, 2019.
Office Action pertaining to corresponding Japanese Patent Application No. 2016-574364, dated Sep. 3, 2019.
Examination Report pertaining to corresponding Indian Patent Application No. 201717001850, dated Jan. 8, 2020.

ETHYLENE-BASED POLYMERS COMPRISING UNITS DERIVED FROM CARBON MONOXIDE AND A RHEOLOGY MODIFYING AGENT

REFERENCE TO RELATED APPLICATIONS

The present application claims the benefit of U.S. Provisional Application No. 62/018,014, filed Jun. 27, 2014, and incorporated herein by reference.

BACKGROUND

Conventional low density polyethylene (LDPE) has good processability; however, when used in film, extrusion coating and/or extrusion lamination applications, improved melt strength is still desired. In addition, there is a need for such polymers that have improved adhesion to cellulosic based substrates, such as paper and paperboard, or polar and other substrates, such as aluminum foil or metalized films such as OPP (oriented polypropylene), metalized PET (polyethylene terephthalate) and the like.

Ethylene-based polymers used for coatings and films are disclosed in the following references: International Publication Nos. WO 2011/071843, WO 1991/18944; U.S. Pat. Nos. 5,178,960, 3,860,538, 4,714,741, 6,558,809, 4,962,164, 3,676,401; GB 1448062; EP 0230143B1; Ward et al., *Ethylene-Carbon Monoxide Extrudable Adhesive Copolymers for Polyvinylidene Chloride*, June 1988 Tappi Journal, pp. 140-144; Scott et al., *Degradable Polymers, Principles and Applications*, Chapter 8: Ethylene-carbon monoxide copolymers, pp. 156-168, Chapman and Hall (1995). See also International Application PCT/US13/076423 (now WO2014/105608), and U.S. Provisional 62/018,050 filed Jun. 27, 2014.

U.S. Pat. No. 6,407,191 discloses the use of carbonyl group containing chain transfer agents to obtain improved polymer processing and performance properties in extrusion processes and applications. The level of carbonyl group containing compound (ketones and aldehydes are claimed) ranges from 0.1 to 0.5 wt %. Production of high molecular weight polymers will restrict the level of ketonic or aldehydic chain transfer agents to be used to control the melt index, and therefore the maximum level which can be incorporated in the polymer to 0.5 wt %.

U.S. Publication No. 2008/0242809 and International Publication Nos. WO 2007/110127, WO97/45465, WO 2012/057975 and WO 2012/084787 describe using various multifunctional components to broaden molecular weight distribution (MWD) and/or modify the rheological properties, for making a copolymer suitable for extrusion coating applications, among others. The multifunctional components include, among others, di- and/or higher functional (meth)acrylates, a bifunctional α,ω-alkadienes, diunsaturated comonomers containing divinyl ether and monomeric chain transfer agents (CTAs). International Application No. PCT/US13/029881 discloses an ethylene-based polymer formed from reacting ethylene and at least one rheology modifying agent comprising an "alpha, beta unsaturated end" and a "C—C double bond end," wherein the reaction takes place in the presence of at least one free-radical initiator.

However, as discussed above, there remains a need for new ethylene-based polymers that have higher melt strengths, and improved adhesion to substrates. These needs have been met by the following invention.

SUMMARY OF THE INVENTION

The invention provides a composition comprising an ethylene-based polymer, comprising at least the following:
A) a unit derived from Carbon Monoxide (CO); and
B) a unit derived from at least one Rheology Modifying Agents (RMA) selected from the following i) through vi):
i) RMA1:

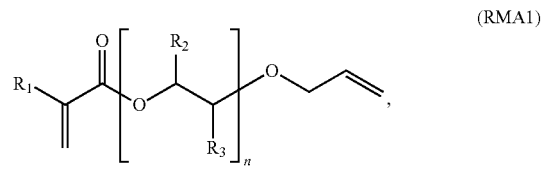

(RMA1)

wherein, for RMA1, $R_1$ is H or an alkyl,
n is from 1 to 50,
$R_2$ is selected from H or an alkyl,
$R_3$ is selected from H or an alkyl;
ii) RMA2:

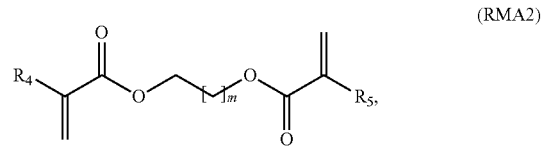

(RMA2)

wherein, for RMA2, $R_4$ and $R_5$ are each independently H or an alkyl,
m is from 1 to 50;
iii) RMA3:

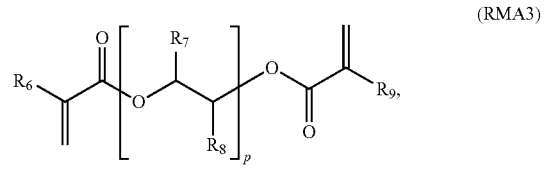

(RMA3)

wherein, for RMA3, $R_6$ and $R_9$ are each independently H or an alkyl,
p is from 1 to 50,
$R_7$ is selected from H or an alkyl,
$R_8$ is selected from H or an alkyl;
iv) RMA4:

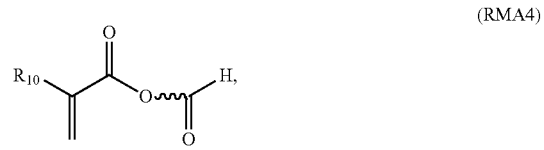

(RMA4)

wherein $R_{10}$ is H or an alkyl,
the notation "∼∼∼" is a hydrocarbon chain comprising from 2 to 50 carbon atoms, and wherein the hydrocarbon chain is linear, branched, or comprises a saturated hydrocarbon ring structure;

v) RMA5

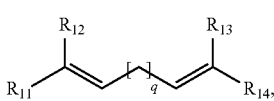

wherein q is from 2 to 20; R11 is selected from H or alkyl; R12 is selected from H or alkyl; R13 is selected from H or alkyl; R14 is selected from H or alkyl; or vi) any combination of i) through v).

DETAILED DESCRIPTION

Figure 1:
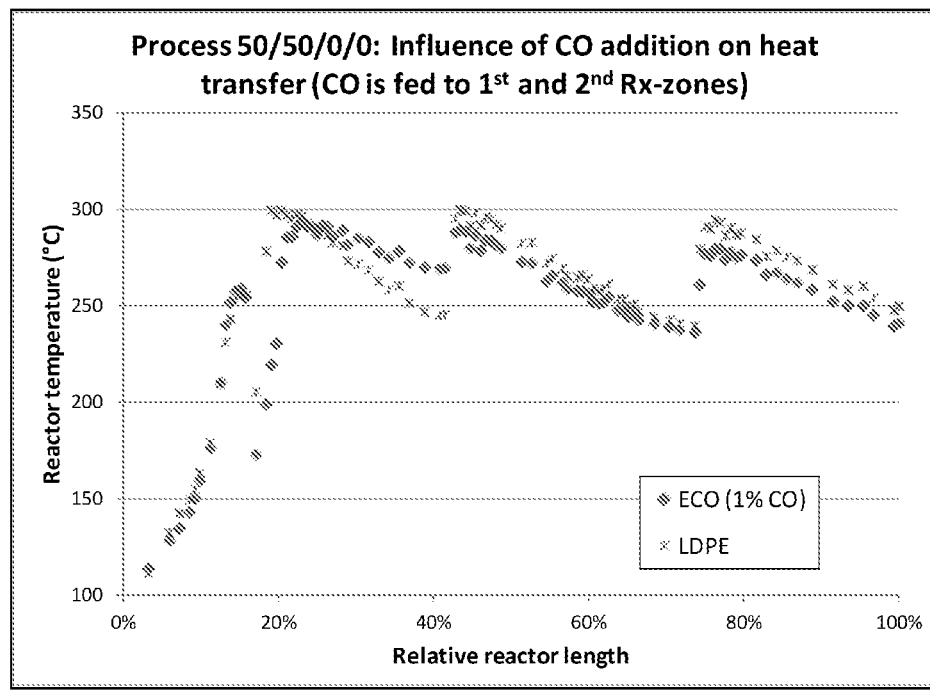
FIG. 1 shows the impact of CO addition on heat transfer in the $2^{nd}$ reaction zone of a tubular reactor. The product contains 1 wt % CO.

As discussed above, the invention provides a composition comprising an ethylene-based polymer, comprising at least the following:

A) a unit derived from Carbon Monoxide (CO); and

B) a unit derived from at least one Rheology Modifying Agent (RMA) selected from the following i) through vi):

i) RMA1:

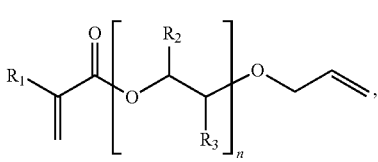

wherein, for RMA1, $R_1$ is H or an alkyl, n is from 1 to 50, further from 1 to 20, and further from 1 to 10, $R_2$ is selected from H or an alkyl, further from H or ethyl or methyl, and further from H or methyl, $R_3$ is selected from H or an alkyl, further from H or ethyl or methyl, and further from H or methyl; and preferably wherein $R_2$ and $R_3$ are each independently selected from the group consisting of the following: (i) $R_2$ and $R_3$ are both H, (ii) when $R_2$ is alkyl, then $R_3$ is H, and (iii) when $R_2$ is H, then $R_3$ is alkyl;

ii) RMA2:

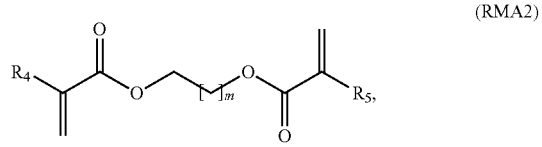

wherein, for RMA2, $R_4$ and $R_5$ are each independently H or an alkyl, further each is independently H or ethyl or methyl, further each is independently H or methyl, m is from 1 to 50, further from 1 to 20, and further from 1 to 10;

iii) RMA3:

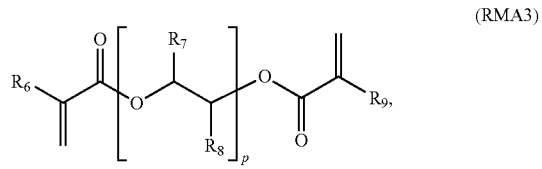

wherein, for RMA3, $R_6$ and $R_9$ are each independently H or an alkyl, further each is independently H or ethyl or methyl, and further each is independently selected from H or methyl, p is from 1 to 50, further from 1 to 20, and further from 1 to 10, $R_7$ is selected from H or an alkyl, further from H or ethyl or methyl, and further from H or methyl, $R_8$ is selected from H or an alkyl, further from H or ethyl or methyl, and further from H or methyl; and preferably wherein $R_7$ and $R_8$ are selected from the group consisting of the following: (i) $R_7$ and $R_8$ are both H, (ii) when $R_7$ is alkyl, then $R_8$ is H, and (iii) when $R_7$ is H, then $R_8$ is alkyl;

iv) RMA4:

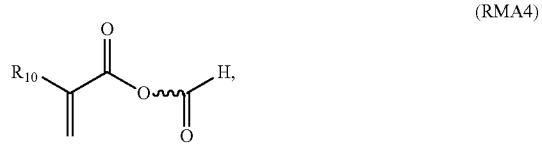

wherein $R_{10}$ is H or an alkyl, further H or ethyl or methyl, further H or methyl, the notation " ~~~ " is a hydrocarbon chain comprising from 2 to 50 carbon atoms, further from 2 to 40 carbon atoms, further from 2 to 30 carbon atoms, further from 2 to 20 carbon atoms, and wherein the hydrocarbon chain is linear, branched, or comprises a saturated hydrocarbon ring structure;

v) RMA5

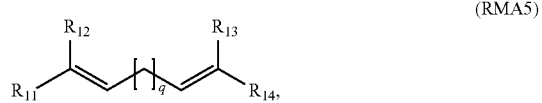

wherein q is from 2 to 20; R11 is selected from H or alkyl, further from H or ethyl or methyl, further from H or methyl; R12 is selected from H or alkyl, further from H or ethyl or methyl, further from H or methyl; R13 is selected from H or alkyl, further from H or ethyl or methyl, further from H or methyl; R14 is selected from H or alkyl, further from H or ethyl or methyl, further from H or methyl; or vi) any combination of i) through v).

An inventive composition may comprise a combination of two or more embodiments described herein.

An inventive ethylene-based polymer may comprise a combination of two or more embodiments described herein.

Since the molecular weight of ethylene and carbon are the same (28.0 g/mole), the percent CO in ethylene is understood as the wt % or mole % of CO in ethylene.

As used herein, the designation R1=$R_1$, R2=$R_2$, R3=$R_3$, and so forth.

In one embodiment, the ethylene-based polymer is formed in the presence of at least one free-radical initiator, and at a pressure greater than, or equal to, 100 MPa.

In one embodiment, the ethylene-based polymer comprises carbonyl groups (—C(O)—) at an amount greater than, or equal to, 1.0 carbonyl per 1000 total carbons (backbone carbons plus carbons in branches). For example, greater than, or equal to, 1.5 carbonyl per 1000 total carbons, 2.5 carbonyl per 1000 total carbons, further greater than, or equal to, 3.0 carbonyl per 1000 total carbons, as determined by 13C NMR.

In one embodiment, the ethylene-based polymer comprises carbonyl groups (—C(O)—) at an amount greater than, or equal to, 0.4 carbonyl per 1000 total carbons (backbone carbons plus carbons in branches). For example, greater than, or equal to, 0.5 carbonyl per 1000 total carbons, 1.0 carbonyl per 1000 total carbons, 1.5 carbonyl per 1000 total carbons, further greater than, or equal to, 2.0 carbonyl per 1000 total carbons, further greater than, or equal to, 2.5 carbonyl per 1000 total carbons, further greater than, or equal to, 3.0 carbonyl per 1000 total carbons, as determined by 13C NMR.

In one embodiment, the ethylene-based polymer comprises greater than, or equal to, 0.5 wt % CO, based on the weight of the polymer. For example, greater than, or equal to, 1.0 wt % CO, further greater than, or equal to, 1.5 wt % CO, further greater than, or equal to, 2.0 wt % CO, further greater than, or equal to, 3.0 wt % CO, based on the weight of the polymer.

In one embodiment, the ethylene-based polymer comprises less than, or equal to, 10.0 wt % CO, based on the weight of the polymer. For example, less than, or equal to, 9.0 wt % CO, further less than, or equal to, 8.0 wt % CO, further less than, or equal to, 7.0 wt % CO, further less than, or equal to, 6.0 wt % CO, based on the weight of the polymer.

In one embodiment, the ethylene-based polymer comprises carbonyl groups (—C(O)—) at an amount from 0.5 to 10.0 wt % CO, further from 1.0 to 8.0 wt % CO, further from 1.5 to 6.0 wt % CO, based on the weight of the polymer.

In one embodiment, the ethylene-based polymer has a melt index (I2) less than, or equal to, 30 g/10 min. For example, less than, or equal to, 25 g/10 min, further less than, or equal to, 20 g/10 min, further less than, or equal to, 15 g/10 min, further less than, or equal to, 10 g/10 min, further less than, or equal to, 5 g/10 min.

In one embodiment, the ethylene-based polymer has a melt index (I2) greater than, or equal to, 0.5 g/10 min. For example, greater than, or equal to, 1.0 g/10 min, further greater than, or equal to, 2.0 g/10 min, further greater than, or equal to, 3.0 g/10 min.

In one embodiment, the ethylene-based polymer has a melt index (I2) greater than, or equal to, 0.1 g/10 min. For example, greater than, or equal to, 0.1 g/10 min, 0.5 g/10 min, 1.0 g/10 min, further greater than, or equal to, 2.0 g/10 min, further greater than, or equal to, 3.0 g/10 min.

In one embodiment, the ethylene-based polymer has a melt index (I2) from 0.5 to 30 g/10 min. For example, from 1.0 to 30 g/10 min, further from 2.0 to 30 g/10 min, further from 3.0 to 30 g/10 min.

In one embodiment, the ethylene-based polymer has a melt index (I2) from 0.1 to 10 g/10 min. For example, from 0.1 to 8 g/10 min, further from 0.3 to 6 g/10 min, further from 0.5 to 3 g/10 min.

In one embodiment, the ratio of the "overall carbonyl content in the polymer" to the "overall carbonyl content in the soluble ethylene-based polymer after hexane extraction" as determined by the Hexane Extractables method, is greater than or equal to, 1.5 carbonyl per 1000 total carbons, as determined by 13C NMR. For example, greater than or equal to, 2.0, further greater than or equal to, 2.5, further greater than or equal to, 3.0, further greater than or equal to, 3.5, further greater than or equal to, 4.0, further greater than or equal to, 5.0, further greater than or equal to, 6.0. Overall carbonyl content was determined by the 13C NMR method as discussed below.

In one embodiment, ethylene-based polymer has a density from 0.912 to 0.950 g/cc, further from 0.912 to 0.940 g/cc (1 cc=1 cm$^3$).

In one embodiment the ethylene-based polymer has a density greater than or equal to 0.910, or greater than or equal to 0.915, or greater than or equal to 0.920 grams per cubic centimeter (g/cc or g/cm$^3$).

In one embodiment the ethylene-based polymer has a density less than or equal to 0.950, or less than or equal to 0.945, or less than or equal to 0.940, or less than or equal to 0.935, or less than or equal to 0.930, grams per cubic centimeter (g/cc or g/cm$^3$).

In one embodiment, ethylene-based polymer has a density from 0.912 to 0.980 g/cc, further from 0.920 to 0.980 g/cc (1 cc=1 cm$^3$).

In one embodiment the ethylene-based polymer has a density less than or equal to 0.980, or less than or equal to 0.970, or less than or equal to 0.960, or less than or equal to 0.950, or less than or equal to 0.940, grams per cubic centimeter (g/cc or g/cm$^3$).

In one embodiment, the ethylene-based polymer has an n-hexane extractable content of less than 4.0 wt %, or less than, or equal to, 3.0 wt %, or less than, or equal to, 2.6 wt %, or less than 2.6 wt %, based on the total weight of the polymer.

In one embodiment, the ethylene-based polymer comprises units derived from Carbon Monoxide (CO) and units derived from at least one incorporated Rheology Modifying Agent. In a further embodiment, the ethylene-based polymer comprises Carbon Monoxide (CO), and at least one Rheology Modifying Agent that has been effectively incorporated into the polymer. The phrase "effectively incorporated" refers to an increase in melt strength of the ethylene-based polymer by at least 10%, as compared to a similar ethylene-based polymer prepared under the same conditions, except without the Rheology Modifying Agent.

In one embodiment, the ethylene based polymer further comprises units of carbonyl derived from ester based and carbon-carbon double bond containing comonomers, and units derived from at least one incorporated Rheology Modifying Agent.

In one embodiment, the carbonyl containing ester based and carbon-carbon double bond containing comonomer is an alkyl acrylate monomer.

In one embodiment, the carbonyl containing ester based and carbon-carbon double bond containing comonomer is vinyl acetate monomer.

In one embodiment the desired incorporation and/or distribution of carbonyl groups containing inter and intra polymer molecules is reached by the use of a fast reacting carbonyl containing comonomer (reactivity is equal to, or more than, a factor of 2 higher than ethylene), for instance alkyl acrylate and CO, and distributing the carbonyl containing comonomer over the reactor, by means of distribution over the ethylene feed streams and/or direct injection(s) into the reactor.

In one embodiment the desired incorporation and/or distribution of carbonyl groups containing inter and intra polymer molecules is reached by the use of carbonyl containing comonomer with reactivity close to ethylene (reactivity is less than a factor of 2 different from ethylene), for instance vinyl acetate, and distributing the carbonyl containing comonomer over the reactor, by means of distribution of the recycle gas streams (containing comonomer) and the make-up (or fresh) ethylene streams over the reactor ethylene feed streams and/or direct injection(s) of make-up (or fresh) comonomer into the reactor.

In one embodiment, the ethylene-based polymer comprises greater than, or equal to, 90 weight percent, further greater than, or equal to, 95 weight percent, polymerized ethylene, based on the weight of the polymer.

In one embodiment, the ethylene-based polymer comprises greater than, or equal to, 97 weight percent, further greater than, or equal to, 98 weight percent, polymerized ethylene, based on the weight of the polymer.

In one embodiment, the ethylene-based polymer has a melting point, Tm, in ° C., which meets the following relationship:

$$Tm\ (° C.) < 601.4\ ((cc/g)° C.)*(Density\ in\ g/cc) - 447.8(° C.).$$

In one embodiment, the ethylene-based polymer has a melting temperature, Tm, greater than 107° C., as determined by DSC (peak temp.).

In one embodiment, the ethylene-based polymer has a melting temperature, Tm, from 105° C. to 108° C., as determined by DSC (peak temp.).

In one embodiment, the ethylene-based polymer has an amyl (C5) group level greater than, or equal to, 1.5 amyl group per 1000 total carbon atoms, further greater than, or equal to, 1.6 amyl group per 1000 total carbon atoms, as determined by 13C NMR.

In one embodiment, the ethylene-based polymer has a molecular weight distribution (MWD, conv. GPC) from 4.0 to 20.0, further from 4.2 to 18.0, further from 4.5 to 15.0, as determined by conventional GPC by the Triple Detector GPC Method (see below).

In one embodiment, the ethylene-based polymer has a molecular weight distribution (MWD, conv. GPC) from 4.0 to 10.0, further from 4.2 to 9.0, further from 4.5 to 8.0, as determined by conventional GPC by the Triple Detector GPC Method (see below).

In one embodiment, the ethylene-based polymer is present at greater than, or equal to, 10 weight percent, based on the weight of the composition.

In one embodiment, the ethylene-based polymer is present in an amount from 10 to 50 weight percent, further from 20 to 40 weight percent, based on the weight of the composition.

In one embodiment, the ethylene-based polymer is present in an amount from 60 to 98 weight percent, further from 65 to 95 weight percent, further from 70 to 95 weight percent, based on the weight of the composition.

In one embodiment, the composition further comprises a second ethylene-based polymer that differs in one or more properties, such as density, melt index, comonomer, comonomer content, etc., from the ethylene-based polymer. In a further embodiment, the second ethylene-based polymer is selected from a LDPE, an ethylene/alpha-olefin copolymer, or a combination thereof.

Other ethylene-based polymers include, but are not limited to, DOWLEX Polyethylene Resins, TUFLIN Linear Low Density Polyethylene (LLDPE) Resins, ELITE and/or ELITE AT Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises a propylene-based polymer. Suitable propylene-based polymers include polypropylene homopolymers, propylene/α-olefin interpolymers and copolymers, and propylene/ethylene interpolymers and copolymers.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.89 to 0.94 g/cc, further from 0.90 to 0.93 g/cc. In a further embodiment, the composition comprises from 1 to 99 weight percent, further from 15 to 85 weight percent, of the inventive ethylene-based polymer, based on the weight of the composition.

In one embodiment, the composition comprises less than 5 ppm, further less than 2 ppm, further less than 1 ppm, and further less than 0.5 ppm, sulfur, based on the weight of the composition.

In one embodiment, the composition does not contain sulfur.

In one embodiment, the composition comprises from 1.5 to 80 weight percent, further from 5.0 to 70 weight percent, further from 10 to 60 weight percent of an inventive ethylene-based polymer. In a further embodiment, the composition further comprises a LLDPE.

In one embodiment, the composition comprises from 1.5 to 20 weight percent, further from 2.0 to 15 weight percent, further from 5.0 to 10 weight percent of an inventive ethylene-based polymer. In a further embodiment, the composition further comprises a LLDPE.

In one embodiment, the composition comprises from 20 to 80 weight percent, further from 50 to 80 weight percent, of an inventive ethylene-based polymer. In a further embodiment, the composition further comprises a LLDPE.

An inventive composition may comprise a combination of two or more embodiments as described herein.

An inventive ethylene-based polymer may comprise a combination of two or more embodiments as described herein.

The invention also provides a process for forming an inventive ethylene-based polymer of any of the previous embodiments, the process comprising polymerizing ethylene, Carbon Monoxide, and at least one Rheology Modifying Agent, in a reactor configuration comprising at least one reactor. The term "reactor configuration," as used herein refers to the apparatus used in a polymerization process; for example, reactor types, compressors, feed configurations and separation vessels.

In one embodiment, the ethylene-based polymer is prepared in a reactor configuration comprising at least one tubular reactor.

In one embodiment, the ethylene-based polymer is prepared in a reactor configuration comprising at least one autoclave reactor.

In one embodiment, the ethylene-based polymer is prepared in a reactor configuration comprising a combination of at least one tubular reactor and at least one autoclave reactor.

An inventive process may comprise a combination of two or more embodiments as described herein.

The invention also provides an article comprising at least one component formed from a composition as described herein.

In one embodiment, the article is a film or a coating.

In one embodiment, the article is a coating for a cable or wire.

In one embodiment, the article is a coated sheet.

In one embodiment, the article is a coating for a cable or wire. In one embodiment, the cable or wire is an electrical or telecommunications wire or cable.

In one embodiment, the article is a coated sheet, and in a further embodiment the sheet is selected from a metal, a paper, or another polymer substrate or combinations thereof. In a further embodiment, the coated sheet is used in a wire or cable configuration.

In another embodiment, the coated sheet is used in a packaging application.

An inventive article may comprise a combination of two or more embodiments as described herein.

Rheology Modifying Agents

The inventive ethylene-based polymer comprises at least one incorporated structure derived from Carbon Monoxide and at least one structure derived from a Rheology Modifying Agent. As used herein, an incorporated structure derived from a Rheology Modifying Agent refers to at least a portion of a rheology modifying agent, which is structurally incorporated into a polymer during polymerization, resulting from polymerizing the ethylene-based polymer in the presence of the rheology modifying agent.

In one embodiment, the inventive ethylene-based polymer may include at least two incorporated structures, respectively derived from two Rheology Modifying Agents. In other words, the inventive ethylene-based polymer may be polymerized in the presence of at least two Rheology Modifying Agents.

In one embodiment, the Rheology Modifying Agent is present in the reactor in an amount greater than or equal to 100 ppm by weight, based on the total amount, by weight, of ethylene in the reactor.

Each Rheology Modifying Agent may comprise a combination of two or more embodiments as described herein.

In one embodiment, the Rheology Modifying Agent is selected from RMA1, as described above.

In one embodiment, the Rheology Modifying Agent is selected from RMA2, as described above.

In one embodiment, the Rheology Modifying Agent is selected from RMA3, as described above.

In one embodiment, the Rheology Modifying Agent is selected from RMA4, as described above.

In one embodiment, the Rheology Modifying Agent is selected from RMA5, as described above.

In one embodiment, two Rheology Modifying Agents selected from RMA1 and RMA2, or selected from RMA1 and RMA 3, or selected from RMA2 and RMA3, or selected from RMA1 and RMA4, or selected from RMA1 and RMA5, or selected from RMA2 or RMA4, or selected from RMA3 or RMA4, or selected from RMA2 or RMA5, or selected from RMA3 or RMA5, or selected from RMA4 and RMA5; each as described above.

In one embodiment, three Rheology Modifying Agents selected from RMA1, RMA2, RMA3, RMA4 and RMA5 are used; each as described above.

In one embodiment, four Rheology Modifying Agents selected from RMA1, RMA2, RMA3, RMA4 and RMA5 are used; each as described above.

In one embodiment, RMA1 is selected from structure RMA1A below:

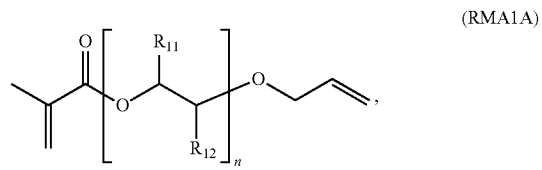

(RMA1A)

wherein n is from 1 to 50, further from 1 to 20 and further from 1 to 10; $R_{11}$ is selected from H or methyl; $R_{12}$ is selected from H or methyl; and in a further embodiment, $R_{11}$ and $R_{12}$ are selected from the group consisting of the following: (i) $R_{11}$ and $R_{12}$ are both H, (ii) when $R_{11}$ is methyl, then $R_{12}$ is H, and (iii) when $R_{11}$ is H, then $R_{12}$ is methyl.

In one embodiment, RMA2 is selected from one of structures a) through f) below:

a)

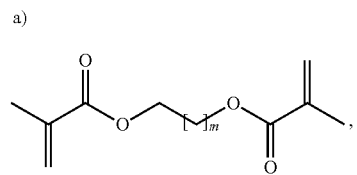

wherein, for structure a), m is from 1 to 50, further from 1 to 20 and further from 1 to 10:

b)

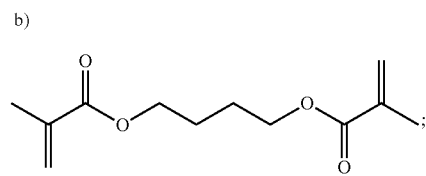

(1,4-butanediol dimethacrylate)

c)

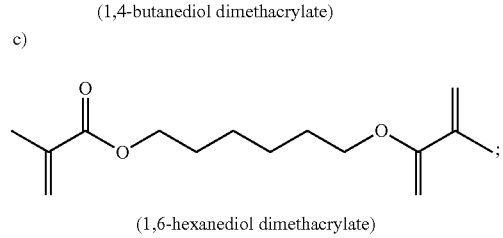

(1,6-hexanediol dimethacrylate)

d)

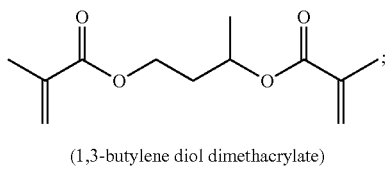

(1,3-butylene diol dimethacrylate)

e)

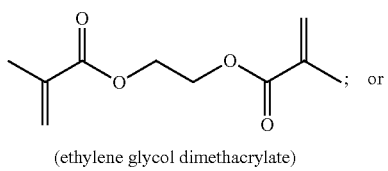

; or (ethylene glycol dimethacrylate)

f)

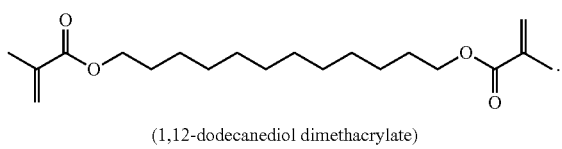

(1,12-dodecanediol dimethacrylate)

Ethylene-Based Polymer

In one embodiment, the ethylene-based polymer is formed in the presence of a free-radical, and at a pressure greater than 100 MPa, and comprises at least one unit derived from Carbon Monoxide and at least one unit derived from a Rheology Modifying Agent.

In one embodiment, the ethylene-based polymer comprises at least one structure derived from carbon monoxide, and comprises structure A below:

A)

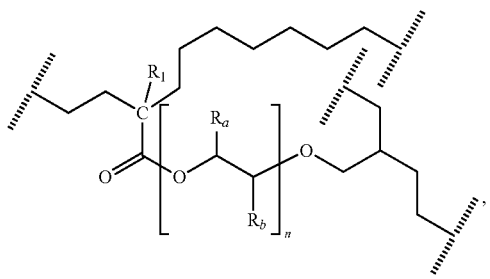

wherein, for structure A, n is from 1 to 50; $R_1$ is selected from H or a $C_1$-$C_6$ alkyl; $R_a$ is selected from H or methyl; $R_b$ is selected from H or methyl; and preferably wherein $R_a$ and $R_b$ are selected from the group consisting of the following: (i) $R_a$ and $R_b$ are both H, (ii) when $R_a$ is methyl, then $R_b$ is H, and (iii) when $R_a$ is H, then $R_b$ is methyl;

In the above structure A), the notation "//////////" represents a break at the center of a covalent carbon-carbon bond in the hydrocarbon backbone of the ethylene-based polymer molecule.

In one embodiment, the ethylene-based polymer comprises, in reacted form, greater than, or equal to, 0.015 moles of a rheology modifying agent, per 1000 moles of carbon atoms, incorporated into the polymer, or, in other words, per 500 moles of ethylene units incorporated into the polymer.

In one embodiment, the ethylene-based polymer comprises, in reacted form, less than, or equal to, 10 moles, or less than, or equal to, 5 moles, or less than, or equal to, 2 moles, or less than, or equal to, 1 mole of rheology modifying agent, per 1000 moles of carbon atoms, incorporated into the polymer, or, in other words, per 500 moles of ethylene units incorporated into the polymer.

Process

For producing a highly branched ethylene-based polymer, a high pressure, free-radical initiated polymerization process is typically used. Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 3000 m. The beginning of a reaction zone, for either type of reactor, is typically defined by the injection and/or activation of a free radical source, and the side injection of ethylene, CTA (or telomer), comonomer(s), and any combination thereof. A high pressure process can be carried out in autoclave or tubular reactors having one or more reaction zones, or in a combination of autoclave and tubular reactors, each comprising one or more reaction zones.

In one embodiment, the inventive process takes place in a reactor configuration comprising a tubular reactor.

In an embodiment, the inventive process takes place in a reactor configuration comprising at least one autoclave and/or tubular reactor.

In one embodiment, the inventive process takes place in a reactor configuration comprising a tubular reactor and an autoclave reactor. In one embodiment, the tubular reactor is downstream from the autoclave reactor.

Often a CTA is used to control molecular weight. In one embodiment, one or more CTAs are added to an inventive polymerization process. CTAs typically comprise at least one of the following groups: alkanes, aldehydes, ketones, alcohol, ether, esters, mercaptan or phosphine. In a further embodiment, a CTA comprises at least one group of an alkane, an unsaturated hydrocarbon, a ketone, an aldehyde, an alcohol or ether. Preferably, a CTA is selected from the group consisting of saturated hydrocarbons, unsaturated hydrocarbons, ketones, aldehydes, alcohols, ethers, esters, mercaptans or phosphines. More preferably, a CTA is selected from the group consisting of saturated hydrocarbons, unsaturated hydrocarbons, ketones, aldehydes, alcohols and ethers. Exemplary CTAs include, but are not limited to, propylene, isobutane, n-butane, 1-butene, methyl ethyl ketone, acetone, ethyl acetate, propionaldehyde, Isopar-C, -E, and -H (ExxonMobil Chemical Co.), and isopropanol. In one embodiment, the amount of CTA used is from 0.03 to 10 weight percent based on the weight of the total reaction mixture.

In one embodiment, in which CTA is added to the polymerization, the ratio of the concentration of the CTA in the feed to reaction zone i, wherein i≥2, and reaction zone i is downstream from reaction zone 1, to the concentration of the CTA in the feed to reaction zone 1, is greater than, or equal to, than 1.0, or greater than 1.5, or greater than 2.0.

In one embodiment in which CTA is added to the polymerization, the ratio of the concentration of the CTA in the feed to reaction zone i, wherein i≥2, and reaction zone i is downstream from reaction zone 1, to the concentration of the CTA in the feed to reaction zone 1, is less than 1.0, or less than 0.8, or less than 0.6, or less than 0.4.

In one embodiment, the process includes a high pressure and low pressure recycle loop to improve ethylene efficiency, since ethylene is only partially converted or consumed per reactor pass. Typically, the conversion level per reactor pass is between 12% and 40%, with the conversion levels for tubular reactors at the higher end of this range, and the conversion levels for autoclave reactors at the lower end of this range.

In one embodiment, the polymerization may take place in a tubular reactor as described in International Application No. PCT/US12/059469, filed Oct. 10, 2012 (now WO2013/059042). This patent application uses a multi-zone reactor, and describes alternate locations of feeding fresh ethylene to control the ethylene to CTA ratio, and therefore polymer properties. Fresh ethylene may be simultaneously added in multiple locations, to achieve the desired ethylene to CTA ratio. In a similar way, addition of fresh CTA at addition points may be carefully selected to control polymer properties, as described in International Application No. PCT/US12/064284, filed Nov. 9, 2012 (now WO2013/078018). Fresh CTA may be simultaneously added in multiple locations, to achieve the desired CTA to ethylene ratio.

Likewise, the addition points and the amount of the fresh rheology modifying agent (branching agent), as described in this application, may be controlled, to control gel formation, while maximizing the desired property of increased melt strength and performance in targeted applications. In one embodiment, fresh rheology modifying agent may be simultaneously added in multiple locations, to achieve the desired rheology modifying agent to ethylene ratio. The use of a rheology modifying agent (branching and/or coupling agent) to broaden MWD, and to increase the melt strength of the polymer will put further requirements on the distribution of the CTA and the rheology modifying agent along a reactor system, in order to achieve the desired change in product properties, without, or by minimizing, potential negative impacts like gel formation, reactor fouling, process instabilities, and low efficiency of rheology modifying agent.

In one embodiment, the polymerization takes place in at least one tubular reactor. In a multi-reactor system, the autoclave reactor usually precedes the tubular reactor. The addition points and amounts of fresh ethylene, fresh CTA, and fresh rheology modifying agent, may be appropriately controlled, to achieve the desired ratios of CTA to ethylene, and rheology modifying agent to ethylene, in the feeds to, and/or in, the reaction zones.

In one embodiment, the rheology modifying agent (branching agent) is an asymmetrical diene, as described herein, and is added to the polymerization in an amount from 0.002 to 0.300 mole percent (mol %), or from 0.005 to 0.300 mol %, based on the total moles of ethylene and asymmetrical diene added to the polymerization.

In one embodiment, the polymerization takes place in a reactor configuration comprising at least two reaction zones, reaction zone 1 and reaction zone i (i≥2), and wherein reaction zone i is downstream from reaction zone 1. In an embodiment, i is from 2 to 6, or from 2 to 5, or from 2 to 4. In one embodiment, the total number of reaction zones=n. In a further embodiment, n is from 1 to 20, further from 1 to 10, and further from 1 to 6.

In one embodiment, more rheology modifying agent, by mass, is added to reaction zone i, (i≥2) as compared to the amount of rheology modifying agent, by mass, added to reaction zone 1. In one embodiment, more rheology modifying agent, by mass, is added to reaction zone 1 as compared to the amount of rheology modifying agent added to reaction zone i (i≥2). As used above, the amount of rheology modifying agent is determined based on the rheology modifying agent added to a reaction zone in a fresh feed (i.e., not carry-over rheology modifying agent).

In one embodiment, a greater concentration of rheology modifying agent is added to reaction zone i, (i≥2) as compared to the concentration of rheology modifying agent added to reaction zone 1. In one embodiment, a greater concentration of rheology modifying agent is added to reaction zone 1 as compared to the concentration of rheology modifying agent added to reaction zone i (i≥2).

In one embodiment, rheology modifying agent is added to both reaction zone 1 and reaction zone i (i≥2). In one embodiment, no rheology modifying agent is added to reaction zone 1.

In one embodiment, the ethylene-based polymer comprises ethylene, carbon monoxide, and optionally, and one or more other comonomers, and preferably one comonomer. Comonomers include, but are not limited to, α-olefins, acrylates, vinyl acetate, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1 butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof.

Free radical initiators are generally used to produce the inventive ethylene-based polymers. A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001-0.2 wt %, based upon the weight of polymerizable monomers.

In one embodiment, an initiator is added to at least one reaction zone and the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6, 6,9,9-hexamethyl-1,2,4,5-tetroxonane) available from United Initiators. See also International Publication Nos. WO 02/14379 and WO 01/68723.

A process for forming an ethylene-based polymer may comprise a combination of two or more embodiments as described herein.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers, for blending, include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)).

Applications

The polymers, polymer blends and compositions of this invention may be employed in a variety of conventional thermoplastic fabrication processes, to produce useful articles, including extrusion coatings onto various substrates; monolayer and multilayer films; molded articles, such as blow molded, injection molded, or rotomolded articles; coatings; fibers; and woven or non-woven fabrics.

An inventive polymer may be used in a variety of films, including but not limited to, food packaging, consumer, industrial, agricultural (applications or films), lamination films, clarity shrink films, collation shrink films, stretch films, silage films, greenhouse films, fumigation films, liner films, stretch hood, heavy duty shipping sacks, pet food, sandwich bags, sealants, and diaper backsheets.

As discussed above, an inventive composition may be used in a variety of extrusion coating applications, such as sugar pouches, paperboard hot and cold drink cups, gable top cartons, non-wovens, woven substrates, tooth paste tubes, stand up pouches, or any other substrate, where traditional LDPE or LLDPE (or blends of either) polymers would be disadvantaged, due to inferior adhesion and low melt strength. The inventive polymer could also be used in a variety of extrusion laminations, where the advantage would be improved adhesion and melt strength in the multi-layer structures, such as aseptic drink boxes, snack packaging, ream wrap, stand up pouches, tooth paste tubes, cheese packaging, lamination films, or any other extrusion lamination, where LDPE or LLDPE (or blends of either) would be disadvantaged due to inferior adhesion and melt strength.

An inventive composition is also useful in other direct end-use applications. An inventive composition may be used for wire and cable coating operations, in sheet extrusion for vacuum forming operations, and forming molded articles, including the use of injection molding, blow molding, or rotomolding processes.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the interpolymer, and a comonomer as the only monomer types.

The term "propylene-based polymer" refers to a polymer that comprises a majority amount of polymerized propylene, based on the weight of the polymer, and, optionally, at least one comonomer.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls each have 1 to 20 carbon atoms.

The term "hydrocarbon," as used herein, refers to an organic molecule containing only hydrogen and carbon atoms.

The term "high pressure polymerization process," as used herein, refers to a free radical polymerization process carried out at an elevated pressure of at least 1000 bar (100 MPa).

The term carbonyl refers to a C=O group incorporated in, or at the end of, a polyethylene homo- or copolymer chain. For example, see the schematic below, wherein A and B depict attached ethylene-based homo- or copolymer chains, or an ethylene-based homo- or copolymer chain, or a group comprising at least a hydrogen atom. The C=O group can, for example, originate from comonomers like carbon monoxide, vinyl acetate, alkyl acrylates, rheology modifying agents, or from polar components like ketones, aldehydes, etc.

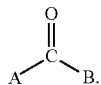

The term "LCB frequency," as used herein, refers to the number of long chain branches (C6 and higher) formed per 500 ethylene molecules or 1000 carbon atoms incorporated in the formed polymer.

The term "SCB frequency," as used herein, reflects the number of short chain branches (C1, C2, C3, C4 and C5) formed per 500 ethylene molecules or 1000 carbon atoms incorporated in the formed polymer.

The term "locally-formed polymer" or "local formed polymer" as used herein, refers to a polymer product produced in a given reaction location. The locally-formed polymer may consist of new polymer molecules and/or new polymer added as long chain branches to already formed polymer molecules. The properties of this polymer might be depicted as function of reactor length or as percentage of the finally formed total polymer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index (I2 or $I_2$) was measured in accordance with ASTM D 1238-10, Condition 190° C./2.16 kg, Method A, and was reported in grams eluted per 10 minutes.

Nuclear Magnetic Resonance ($^{13}$C NMR)

Samples were prepared by adding approximately "3 g" of a "50/50 mixture of tetrachloroethane-d2/orthodichlorobenzene, containing 0.025 M Cr(AcAc)$_3$," to a "0.25 to 0.40 g" polymer sample, in a 10 mm NMR tube. Oxygen was removed from the sample by purging the tube headspace with nitrogen. The samples were dissolved and homogenized by heating the tube and its contents to 145-150° C. using a heating block and heat gun. Each sample was visually inspected to ensure homogeneity.

All data were collected using a Bruker 400 MHz spectrometer. The data was acquired using a six second pulse repetition delay, 90-degree flip angles, and inverse gated decoupling, with a sample temperature of 120° C. All measurements were made on non-spinning samples in locked mode. Samples were allowed to thermally equilibrate for seven minutes prior to data acquisition. The 13C NMR chemical shifts were internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value. The level of CO units per 1000 C is determined as the integral of the peaks due to the ketone carbonyl, from about 42 to 43.5 ppm, divided by 2. In the ECO, the mol % CO and the wt % CO values are the same. Mol % CO is calculated from the following equations:

CO units/1000C=moles CO per 1000 total polymer carbons,

Moles ethylene=(1000−CO units/1000 C)/2, mol % CO=100*moles CO per 1000 total carbons/ (moles CO+moles ethylene), Moles CO units per 1000 total carbons is calculate from Mol % CO as follows:

X=Mol % CO,

By definition, Mol % CO=X moles CO/(100−X)moles ethylene,

Y=Moles ethylene carbons=moles ethylene*2CO/ 1000C=[X/(X+Y)]*[1000/(X+Y)]

Total carbonyls are all carbonyls including those from carbon monoxide, chain transfer agents, esters, and so forth. When determining the overall (or total) carbonyl content, including carbonyl derived from carbon monoxide and other "carbonyl-containing compounds (for example, acrylates and vinyl acetate)," the signal frequencies corresponding to such compounds are also considered. Such frequencies are known by those or ordinary skilled in the art.

Nuclear Magnetic Resonance ($^1$H NMR)

Sample Preparation

The samples were prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The samples were purged by bubbling N2 through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N2 purge box, during storage, before, and after, preparation, to minimize exposure to O2. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis—1H NMR Calculations

The signal from residual 1H in TCE (Tetrachloroethane)-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two, to obtain a value representing X thousands of carbons (i.e., if the polymer integral=28,000, this represents 14,000 carbons, and X=14). The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Hexane Extractables

Polymer pellets (from the polymerization, pelletization process without further modification) were pressed in a Carver Press, at a thickness of 3.0-4.0 mils (approximately 2.2 grams of pellets pressed into a film). The pellets were pressed at 190° C., for three minutes, at 3,000 lb$_f$, and then at 190° C., for three minutes, at 40,000 lb$_f$. Non-residue gloves (PIP* CleanTeam* Cotton Lisle Inspection Gloves, Part Number: 97-501) were worn, so as to not contaminate films with residual oils from the hands of the operator. Films were cut into "1 inch×1 inch" squares, and weighed. Enough film samples were used, such that "2.5 g" of film samples were used for each extraction. The films were then extracted for two hours, in a hexane vessel containing about 1000 ml of hexane, at "49.5±0.5° C." in a heated water bath. The hexane used was an isomeric "hexanes" mixture (for example, Hexanes (Optima), Fisher Chemical, High purity mobile phase for HPLC and/or extraction solvent for GC applications, 99.9% min by GC). After two hours, the films were removed, rinsed in clean hexane, initially dried with nitrogen, and then further dried in a vacuum oven (80±5° C.) at full vacuum (ISOTEMP Vacuum Oven, Model 281A at approximately 30 inches Hg) for two hours. The films were then placed in a desiccator, and allowed to cool to room temperature for a minimum of one hour. The films were then reweighed, and the amount of mass loss due to extraction in hexane was calculated. The [(amount of mass loss/initial weight of film)×100]=the weight percent of hexane extractable.

Triple Detector Gel Permeation Chromatography (TDGPC)—Conventional GPC Data

A Triple Detector Gel Permeation Chromatography (3D-GPC or TDGPC) system consisting of a Polymer Laboratories (now Agilent) high temperature chromatograph Model 220, equipped with a 2-angle laser light scattering (LS) detector Model 2040 (Precision Detectors, now Agilent), an IR-4 infra-red detector from Polymer Char (Valencia, Spain), and a 4-capillary solution viscometer (DP) (Viscotek, now Malvern) was used. Data collection was performed using Polymer Char DM 100 data acquisition box and related software (Valencia, Spain). The system was also equipped with an on-line solvent degassing device from Polymer Laboratories (now Agilent).

High temperature GPC columns consisting of four 30 cm, 20 um mixed A LS columns from Polymer Laboratories (now Agilent) were used. The sample carousel compartment was operated at 140° C., and the column compartment was operated at 150° C. The samples were prepared at a concentration of "0.1 grams of polymer in 50 milliliters of solvent." The chromatographic solvent and the sample preparation solvent was 1,2,4-trichlorobenzene (TCB) containing 200 ppm of 2,6-di-tert-butyl-4methylphenol (BHT). The solvent was sparged with nitrogen. The polymer samples were gently stirred at 160° C. for four hours. The injection volume was 200 microliters. The flow rate through the GPC was set at 1.0 ml/minute.

Column calibration and sample molecular weight calculations were performed using Polymer Char "GPC One" software. Calibration of the GPC columns was performed with 21 narrow molecular weight distribution polystyrene standards. The molecular weights of the polystyrene standards ranged from 580 to 8,400,000 g/mol, and were arranged in 6 "cocktail" mixtures, with at least a decade of separation between the individual molecular weights.

The peak molecular weights of polystyrene standards were converted to polyethylene molecular weights using the following equation (as described in Williams and Ward, J. Polym. Sci., Polym. Let., 6, 621 (1968)):

$$M_{polyethylene} = A(M_{polystyrene})^B.$$

Here B has a value of 1.0, and the experimentally determined value of A is around 0.38 to 0.44.

The column calibration curve was obtained by fitting a first order polynomial to the respective polyethylene-equivalent calibration points obtained from the above Equation to the observed elution volumes.

Number, weight, and z-average molecular weights were calculated according to the following equations:

$$\overline{Mn} = \frac{\sum_i Wf_i}{\sum_i \left(\frac{Wf_i}{M_i}\right)} \quad \overline{Mw} = \frac{\sum_i (Wf_i * M_i)}{\sum_i Wf_i} \quad \overline{Mz} = \frac{\sum_i (Wf_i * M_i^2)}{\sum_i (Wf_i * M_i)}.$$

Where, $Wf_i$ is the weight fraction of the i-th component and $M_i$ is the molecular weight of the i-th component. The molecular weight distribution (MWD) was expressed as the ratio of the weight average molecular weight (Mw) to the number average molecular weight (Mn).

The A value was determined by adjusting the A value in the Williams and Ward Equation until Mw, the weight average molecular weight calculated using the above Equation, and the corresponding retention volume polynomial agreed with the independently determined value of Mw obtained in accordance with the linear homopolymer reference with known weight average molecular weight of 115,000 g/mole.

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A "25 mm disk" was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. The Orchestrator software was used to select the data in the region where G" was between 200 and 800 Pa (or using at least 4 data points). The data were fit to a log polynomial model using the fit equation Y=C1+C2 ln(x). Using the Orchestrator software, G' at G" equal to 500 Pa was determined by interpolation.

In some cases, the G' (at a G" of 500 Pa) was determined from test temperatures of 150° C. and 190° C. The value at 170° C. was calculated from a linear interpolation from the values at these two temperatures.

Differential Scanning Calorimetry (DSC)

Differential Scanning calorimetry (DSC) was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature ($T_m$), peak crystallization temperature ($T_c$), heat of fusion ($H_f$) (in Joules per gram), and the calculated % crystallinity for polyethylene samples using: % Crystallinity=(($H_f$)/(292 J/g))×100. The heat of fusion ($H_f$) and the peak melting temperature were reported from the second heat curve. Peak crystallization temperature is determined from the cooling curve.

Experimental

Polymerization Simulations

A polymerization simulation model with applied reaction scheme and kinetics is described by Goto et al. (see below). Other reactor and product modeling frameworks are available through Aspen Plus of Aspen Technology, Inc., Burlington, Mass., USA; and PREDICT of Dr. Wulkow Computing in Technology GmbH (CiT), Rastede, Germany. Process and product responses, predicted by these model frameworks, are determined by the reactor parameters and the applied reaction scheme and kinetic parameters. The applied reaction scheme and kinetic parameters are described below.

The polymerization simulations were achieved with the Goto LDPE simulation model as described in the following: S. Goto et al; *Journal of Applied Polymer Science: Applied Polymer Symposium*, 36, 21-40, 1981 (*Title: Computer model for commercial high pressure polyethylene reactor based on elementary reaction rates obtained experimentally*).

The kinetic data used by "Goto et al." was derived from high pressure free radical polyethylene polymerization experiments, performed at varying temperature, pressure and polymer concentration as described in the following: K. Yamamoto, M. Sugimoto; *Rate constant for long chain-chain branch formation in free-radical polymerization of ethylene*; *J. Macromol. Science-Chem.*, A13 (8), pp. 1067-1080 (1979). The following elementary reaction steps are described by Goto et al.: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

See Table 1 for kinetic data for main reactions, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as analyzed by the $^{13}$C NMR technique) in high pressure polyethylene, as a function of pressure and temperature conditions.

TABLE 1

Kinetic Constants for Main Reactions

| Reaction | ko<br>m³/hr/kgmol | Ea<br>cal/mol | ΔV<br>cc/mol |
|---|---|---|---|
| Propagation | 5.63E+11 | 10,520 | −19.7 |
| Termination | 3.0E+11 | 3,000 | 13.0 |
| Backbiting | 2.6E+12 | 12,130 | −14.0 |
| Transfer to Polymer | 1.75E+12 | 14,080 | 4.4 |
| Beta Elimination of Secondary Radical | 5.82E+11 | 15,760 | −22.6 |
| Beta Elimination of Tertiary Radical | 8.51E+10 | 14,530 | −19.7 |

The kinetic data for selected CTAs is given in Table 2. The kinetic constants were calculated with the kinetic constants of the Cs-value (ks/kp), as determined by Mortimer (see references after Table 3, and the ethylene propagation kinetics as given by Goto et al. (see Table 1 above).

The Rheology Modifying Agents have been modeled as agents having a "carbon-carbon double bond A" and a "carbon-carbon double bond B," or as agents having a "carbon-carbon double bond" and a functional group with CTA activity (monomeric CTAs). This does not exclude the potential use of multifunctional components having multiple monomeric and/or CTA functional groups.

The rheology modifying agents have been described and modeled through assigning kinetic $r_1$ and $r_2$ reactivity ratios (see Tables 2 and 3 below). The kinetic $r_1$ and $r_2$ reactivity ratios are, by definition, linked to the ethylene propagation kinetics for their temperature (Ea) and pressure (ΔV) dependencies. In the simulations, it was assumed that the rheology modifying agents do not exhibit additional chain transfer activity. Furthermore, for the total consumption, incorporation and H-branch (inter- and intra-molecular) formation, it has been assumed that, after incorporation of one functional group, the reactivity of the other functional group is not affected. In reality, the reactivity of second functional group will be decreased, after incorporation of the rheology modifying agent through its primary functional group in a polymer molecule. However, this assumption will not affect the scope of this study, since the target rheology will be met by increasing or decreasing the amount of the Rheology Modifying Agent.

TABLE 2

Kinetic Constants for Selected CTAs

| Component | Chain Transfer to Modifier | | | Reactivity Ratios | |
|---|---|---|---|---|---|
| | kao<br>m³/hr/kgmol | Ea<br>cal/mol | ΔV<br>cc/mol | $r_1$ ($k_{11}/k_{12}$) | $r_2$ ($k_{22}/k_{21}$) |
| Propylene (CTA) | 2.20E+11 | 13,220 | −16.7 | 3.10 | 0.77 |
| Propionaldehyde (CTA) | 1.07E+11 | 9,720 | −8.4 | 0.00 | 0.00 |
| Isobutane (CTA) | 3.51E+11 | 14,020 | −16.7 | 0.00 | 0.00 |
| Monomeric CTA | 1.41E+12 | 10,520 | −19.7 | 0.08 | 12.5 |

TABLE 3

Reactivity Ratios for Rheology Modifying Agents
(Bifunctional Model Components)

| | | Reactivity Ratios | | |
|---|---|---|---|---|
| | | $r_{1B}/r_{1A}$ | $r_1$ ($k_{11}/k_{12}$) | $r_2$ ($k_{22}/k_{21}$) |
| RMA2 or RMA3 | Bond A | 1 | 0.08 | 12.50 |
| (Sym bi-acrylate) | Bond B | | 0.08 | 12.50 |
| RMA1 (Asym-acrylate) | Bond A | 5 | 0.08 | 12.50 |
| | Bond B | | 0.40 | 2.50 |
| RMA5 (HC diene) | Bond A | 1 | 1 | 1 |
| | Bond B | | 1 | 1 |

Sym bi-acrylate = symmetrical bi-acrylate or bi-methacrylate;
Asym-acrylate = asymmetrical acrylate or methacrylate;
HC diene = hydrocarbon diene Chain transfer activity and comonomer reactivity scheme data are described in the following: P. Ehrlich, G. A. Mortimer, *Fundamentals of the free radical polymerization of ethylene*, Adv. Polymer Sci., Vol 7, 386-448 (1970); G. Mortimer, Journal of Polymer Science: Part A-1; *Chain transfer in ethylene polymerization*; vol 4, p 881-900 (1966); G. Mortimer, Journal of Polymer Science: Part A-1, *Chain transfer in ethylene polymerization. Part IV. Additional study at 1360 atm and 130° C.*; vol 8, p 1513-1523 (1970); G. Mortimer, Journal of Polymer Science: Part A-1, *Chain transfer in ethylene polymerization. Part V. The effect of temperature*; vol 8, p 1535-1542 (1970); G. Mortimer, Journal of Polymer Science: Part A-1, *Chain transfer in ethylene polymerization Part V. The effect of pressure*, vol 8, p 1543-1548 (1970); and G. Mortimer, Journal of Polymer Science: Part A-1, *Chain transfer in ethylene polymerization VII. Very reactive and depleteable transfer agents*, vol 10, p 163-168 (1972). Table 4 lists the kinetic parameters for free radical CO copolymerization with ethylene (see Buback reference below). Activation energy has been derived from $r_{10}$ data measured at 150 and 220° C. (Buback et al.; Physica 139 &140B, 626-628 (1986)).

TABLE 4

Kinetic parameters for ethylene-CO high pressure free radical copolymerization

| Reactivity ratio $r_{1,0}$ | Activation energy $E_a$ cal/mole | Activation volume $E_v$ cc/mole | Reactivity ratio $r_{2,0}$ |
|---|---|---|---|
| 2.06 | 3,322 | 0 | 0 |

Where $r_{1,0}$ is the pre-exponential factor.
And the reactivity ratio is calculated by: $r_1 = r_{1,0} * \exp(-E_a/RT)$.

Due to the alternating copolymerization mechanism, two consecutive incorporations of CO are not possible ($k_{22}=0$), therefore $r_2=k_{22}/k_{21}=0$.

Use of Rheology Modifying Agent:

In the comparative and inventive polymerizations, using H- or T-branching rheology modifying agents to enhance the melt strength of the polymer, the following concentration levels in the overall ethylene feed have been used for the different rheology modifying agents, namely:

RMA2 (symmetrical bi-acrylate): 100 mole ppm
RMA1 (asymmetrical acrylate): 150 mole ppm
RMA3 (monomeric CTA): 300 mole ppm Depending on the branching formation efficiency, and the impact of the formed branching on melt strength, the level of rheology modifying agent can be increased, or decreased, to reach the required melt strength level of target product. The melt index ($I_2$) of the final product was kept at 4 dg/min, by adjusting the CTA concentration in the simulations. The effectiveness of a rheology modifying agent (RMA1), to enhance melt strength, is demonstrated in Table 5. The two polymerization examples show two identical polymerizations, one with a rheology modifying agent (RMA1) and one without a rheology modifying agent. Adding and distributing 0.44 wt % of the RMA1 to the ethylene feed, doubled the melt strength of the produced material. Furthermore, it was observed that the reactor temperature profile was not affected by the addition of the rheology modifying agent. Thus, suggesting that the addition of the rheology modifying agent does not affect heat transfer. In the simulations shown below, it was assumed that the addition of the RMA did not affect heat transfer.

TABLE 5

Melt strength product properties of LDPE produced with and without an asymmetrical rheology modifying agent.

|  |  | LDPE with Asym-acrylate | LDPE without Asym-acrylate |
|---|---|---|---|
| MI (or I2) | dg/min | 3.7 | 4.0 |
| Density | g/cc | 0.9228 | 0.9237 |
| Melt Strength | cN | 8.9 | 4.3 |
| hexane extractable | wt % | 1.70 | 1.46 |
| Inlet Pressure | Bar | 2,220 | 2,220 |
| RMA1 | Type | Asym-acrylate | 0 |
| Ethylene Distribution |  | 50/40/10 | 50/40/10 |
| RMA Distribution | kg/hr | 40/20/5 | 0/0/0 |
| RMA Distribution | mole ppm | 148/41/10 | 0/0/0 |

Use of CO as Comonomer:

Reaction Characteristics in Regard to Reactor Stability and Maximum Temperature Capability Colombo et al. (Journal of Polymer Science, A1, 6, 3201-3215 (1968)) show the following: a) the individual reaction rate of CO is much faster than the individual reaction rate of ethylene; however the incorporation of a CO unit has to be followed by the incorporation of an ethylene unit; b) formation of an alternating CO and ethylene copolymer is preferred; and c) ethylene-carbon monoxide copolymer contains maximal 50 mole % CO. These characteristics led to the following impact on overall propagation rate: a) the rate is strongly influenced by the CO concentration in the reactor; b) the rate is maximal for 100 wt % ethylene, zero for 100 wt % CO; and c) the rate has a sub optimum at CO concentrations between 30 to 50 wt % in the reaction mixture.

Colombo et al. show that the overall propagation rate dropped, from a maximum at 100% ethylene, by a factor of 10, or more, for CO concentrations of 4 wt % or lower. This behavior can lead to potential unstable operation in "multi reaction zone" reactor systems. Especially, the stability in a tubular based reactor system could be affected, since the overall propagation rate could accelerate in a tubular reaction zone by the consumption and depletion of CO comonomer along the reaction zone. The occurrence of an accelerating "overall propagation rate" is confirmed by Buback et al. (Physica 139 &140B, 626-628 (1986)).

The ethylene-carbon monoxide copolymers of this invention are made with carbon monoxide concentrations in the overall ethylene feed, ranging from 0.2 to 4 wt % CO. The distribution of carbon monoxide over the ethylene feeds needs careful consideration, in regard to process safety, and in regard to the desired distribution of the incorporated carbon monoxide monomer inter and intra polymer molecules. High concentrations at the inlet of a tubular reaction zone should be avoided. Furthermore, application of autoclave reaction zone(s) in a tubular based reactor system will improve reaction stability. The polymerization is performed at the lower CO outlet concentration in a CSTR (continuous stirred tank reactor) reaction zone, while in a tubular reaction zone, the CO concentration ranges from higher, at the inlet, to lower, at the outlet, versus a CSTR reactor zone.

Lowering maximum polymerization temperature will help to improve and counteract negative effects on polymerization stability. Based on the above reaction and process stability characteristics, the maximum peak temperatures in the reaction zones, receiving a fresh carbon monoxide feed, are limited to 290° C. The maximum operating temperature is further reduced for higher CO concentrations.

Feeding and Distribution of Carbon Monoxide in a High Pressure Polymerization Process:

Carbon monoxide is a gaseous component supplied by pressurized pipeline and/or pressurized cylinder. Due to its gaseous state, the pressurized carbon monoxide is fed to a high pressure free radical process, at one of the various compression stages of the booster or primary compressor, and compressed and fed to inlet side of the secondary compressor, through the remaining compression stages of the primary and/or booster compressor. Without taking special precautions in the design and line-up of the booster, primary, secondary compressor systems, CO will be evenly distributed over the ethylene feed streams to the reactor; however by taking special precautions in the design and line-up of the booster, primary and secondary compressor and high pressure recycle system, differentiated CO concentrations can be achieved in the various ethylene feed streams to the reactor.

Impact of the Use CO on Heat Transfer in Tubular Reactor Zones:

Impact of heat transfer: The use of CO comonomer in a tubular free radical polymerization leads to strongly reduced heat transfer as shown in FIG. 1. This figure compares, for the same reactor, a temperature profile for a LDPE homopolymer versus an ethylene-carbon monoxide (99%-1%) copolymer with similar melt-indices, namely 0.75 versus 0.55 g/10 min. The carbon monoxide is fed together with the ethylene to Rx-zones 1 and 2. No heat transfer analysis can be made for Rx-zone 1, due to the short length and rising temperature profile, while the $2^{nd}$ Rx-zone shows strongly reduced heat transfer after the temperature maximum, while the $3^{rd}$ and $4^{th}$ Rx-zones receiving no additional CO feed, show normal heat transfer. The reduced heat transfer is thought to be affected by the formation of a fouling layer at the inside tube wall, and is found to be affected by the applied CO concentration. FIG. 1 shows the temperature profiles for a process producing an ethylene (99 wt %)-carbon monoxide (1 wt %) copolymer (based on the weight of the copolymer) with a 50/50/0/0 ethylene distribution, in which CO is evenly distributed over the ethylene feeds.

The heat resistance at the inside process side through fouling can be expressed as an apparent thickness of an inside fouling layer. The fouling layer thickness can be linearly translated to heat resistance with the following factor: 30*10E-6 [m] fouling layer=a heat resistance of 0.00023 [m^2 h ° C./Kcal].

For LDPE homopolymer, an inside fouling factor of $30 \times 10^{-6}$ m can be generally taken to achieve a matching simulated temperature profile. For a "1 wt % CO" copolymer (based on the weight of the copolymer) product, the inside fouling factor in the $2^{nd}$ Rx-zone has to be tripled, to match the observed temperature profile, while the inside fouling in the $3^{rd}$ and $4^{th}$ reaction zones are hardly affected by the ethylene-carbon monoxide production. The following simplified model was developed, and applied, to simulate the impact of the presence and level of added CO to a reaction zone, on the fouling factor of a reaction zone.

Fouling factor=$20 \times 10^{-6} + 20 \times 10^{-6}$*[CO (ppm)]/500 (ppm)]

Note: All Rx-zones receiving no CO have a fouling factor of $30 \times 10^{-6}$ m Table 6 demonstrates how the fouling factor depends on the level and presence of CO comonomer for a tubular process with a 50/50/0/0 ethylene distribution, with even distribution (kg or mass) of CO over both ethylene feed streams (the "50/50").

TABLE 6

| Concentration in mole ppm of CO fed at inlet of reaction zone in cumulative ethylene stream | | | | |
|---|---|---|---|---|
| 1st Rx-zone | 0 | 3,000 | 4,500 | 9,000 |
| 2nd Rx-zone | 0 | 1,500 | 2,250 | 4,500 |
| 3rd Rx-zone | 0 | 0 | 0 | 0 |
| 4th Rx-zone | 0 | 0 | 0 | 0 |
| Fouling factor ($10^{-6}$) m | | | | |
| 1st Rx-zone | 30 | 150 | 210 | 390 |
| 2nd Rx-zone | 30 | 90 | 120 | 210 |
| 3rd Rx-zone | 30 | 30 | 30 | 30 |
| 4th Rx-zone | 30 | 30 | 30 | 30 |

Figure 2:
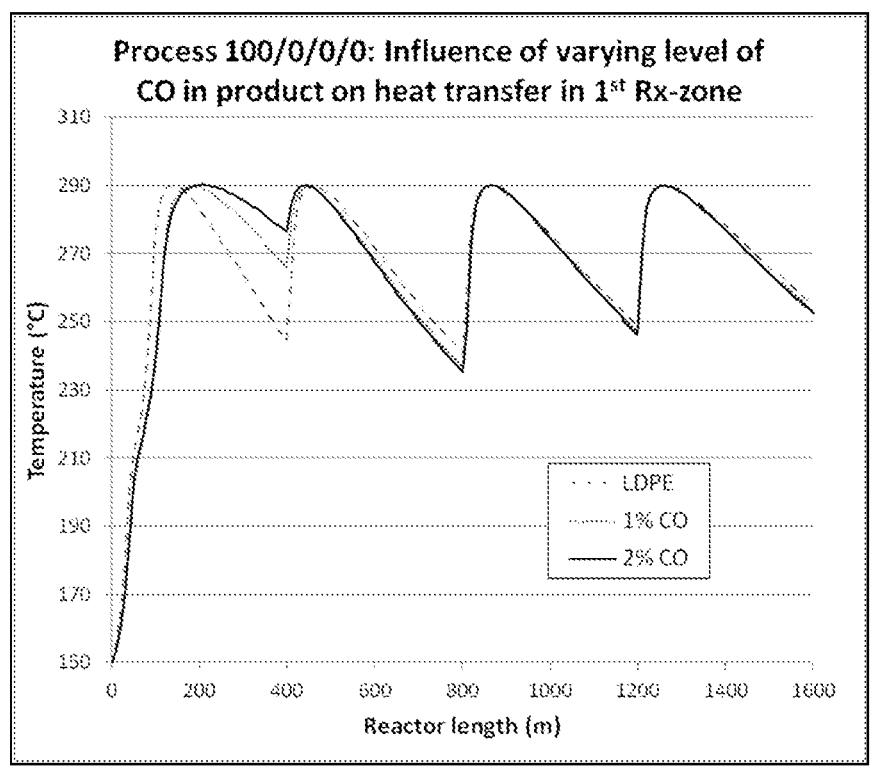
FIG. 2 shows the modeled influence of the level of CO on heat transfer in the $1^{st}$ reaction zone of a tubular process with a 100/0/0/0 ethylene and CO feed distribution (1 and 2% is the CO content of the produced polymer).

FIG. 2 shows the impact of the changing fouling on the temperature profile for a process with a 100/0/0/0 ethylene distribution, when producing products with 0 wt %, 1 wt % and 2 wt % CO level. In the "100/0/0/0 process," all CO is fed, with the ethylene, to the 1st Rx-zone.

Description of Flow Diagram

Figure 3:
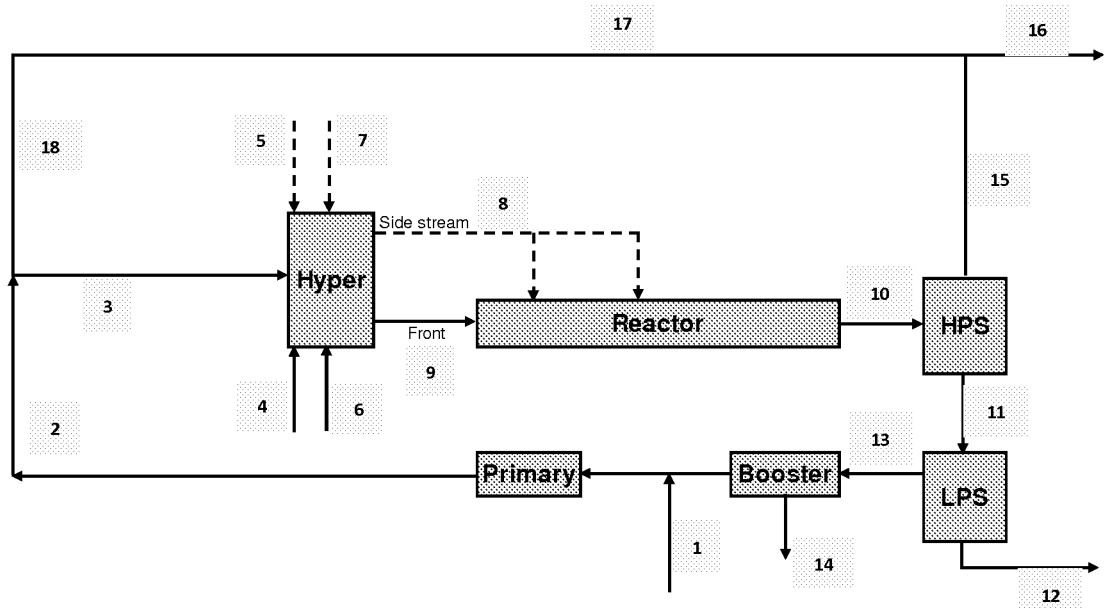
FIG. 3 is a general flow diagram showing the configuration of a high pressure LDPE polymerization configuration containing a tubular reactor.

FIG. 3 shows a generalized flow scheme of a simulated high pressure polymerization configuration containing a tubular reactor. Stream (1) is the fresh ethylene make-up, which is compressed together with the outlet of the Booster by the Primary to stream (2). Furthermore carbon monoxide (CO) can be added through line (1). Stream (2) is combined with high pressure recycle stream (18) and distributed over the suction inlets of the Hyper. The Hyper pressurizes the ethylene feed streams to a level sufficient to feed the high pressure tubular reactor (Reactor). Although not depicted, the flow scheme could include partial combination and/or distribution of the stream (2) and stream (18) over the inlets of the Hyper.

Stream (4) and/or (5) depicts the CTA system make-up feed. The CTA make-up, in principle, be freely distributed over the main compression streams fed and/or distributed over the side stream (8) and front stream (9). CTA make-up streams (4) and/or (5) can be fed in the inlet(s), interstage(s), outlet(s) of the Hyper and/or inlet(s) of the reaction zones. The CTA system can consist of single and/or multiple components and include varying compositions.

Without taking special precautions in the design and line-up of the booster, primary, secondary compressor systems, CO will be distributed at even concentrations over the ethylene feed streams to the reactor; however by taking special precautions in the design and the line-up of the booster, primary and secondary compressor and high pressure recycle systems, differentiated CO concentrations can be achieved in the various ethylene feed streams to the reactor. Stream (6) and/or stream (7) depict the optional rheology modifying agent feed. The rheology modifying agent or carbonyl containing comonomer, like alkyl acrylates, vinyl acetate, etc, feed(s) can, in principle, be freely distributed over the main compression streams fed to, and/or distributed over, the side stream (8) and/or front stream (9). Rheology modifying agent streams (6) and/or (7) can be fed in the inlet(s), interstage(s), outlet(s) of the Hyper, individual ethylene feed streams to the reactor, and/or directly into the reaction zones. The discharge temperature of the Hyper is typically in the range of 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor.

The polymerization conditions are given in Table 6. In the reactor, the polymerization is initiated with the help of free radical initiation systems injected and/or activated at the inlet of each reaction zone. The maximum temperature in each reaction zone is controlled at a set point by regulating the concentration and/or feed amount of initiation system at the start of each reaction zone. After finishing the reaction, and having applied cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts.

The polymer separated in the LPS is further processed in (12). The ethylene removed in the LPS (13) is fed to the Booster, where, during the compression, condensables, such as solvent, lubrication oil and others, are collected and removed through stream (14). The outlet of the Booster is combined with make-up ethylene stream (1), and further compressed by the Primary.

FIG. 2 shows an exemplary process flow diagram to achieve the even concentration of CO in the ethylene feed streams.

Reactor and Feed Configurations Used in Comparative and Inventive Polymerizations Table 7 shows the reactor configuration (i.e., dimensions, lay-out, applied ethylene feed distribution) used for the simulated comparative and inventive polymerizations. The notation "100/0/0/0" means that all the total ethylene feed is fed to the first reaction zone, while no fresh feed streams are fed to the second, third and fourth reaction zones. The ethylene received in the second, third and fourth reaction zones is carry-over from the previous reaction zones. Likewise, the notations "50/50/0/0" means that 50% of the total ethylene feed is fed to the first reaction zone and 50% of the total ethylene feed is fed to the second reaction zone, while no fresh feed streams are fed to the third and fourth reaction zones. The ethylene received in the third and fourth reaction zones is carry-over from previous reaction zones.

The notation "25/25/50/0" means that 25% of the total ethylene feed is fed to the first reaction zone, and 25% of total ethylene is fed to the second reaction zone, and 50% of the total ethylene feed is fed to the third reaction zone, while no fresh feed streams are fed to the fourth reaction zone. The ethylene or branching agent received in the fourth reaction zone is carry-over from previous reaction zones.

Further columns, in Table 7, give information on pressure level and start temperature at the inlet of the first reaction zone, the ethylene feed temperature, when a side ethylene feed stream is applied, and the maximum or peak temperatures in each reaction zone.

ture level can be varied), condensate, boiling condensate, etc. The temperature of the cooling media is typically in the range of 0 to 220° C., while the temperature for preheating services is typically in the range of 100 to 250° C. The cooling/heating is applied through jackets around the high pressure tubes by co-current or counter-current flow. Single or multiple cooling and/or heating zones can be applied in the reactor or in a reaction zone. In the simulations the cooling/preheating was applied by counter-current, and with one cooling section per reaction zone.

Table 8 shows the rheology modifying agent (RMA) type and the feed distributions used for the rheology modifying agent and carbon monoxide additions. The ethylene feed distributions show the percent of total ethylene feed stream fed to each reaction zone, while the rheology modifying

TABLE 7

Reactor Configurations, Feed Modes, Process Conditions Used in Comparative and Inventive Polymerizations

| Ex. | Tstart/Tside ° C. | Peak temp ° C. | Pressure bar | CO injection Rx-zone | Fouling factor $10^{-6}$ m | CTA (PA) ppm |
|---|---|---|---|---|---|---|
| Comparative Polymerizations (CP) 1-3 and Inventive Polymerizations (IP) 1-4: Ethylene feed distribution 100/0/0/0; Inside tube diameter (60 mm) and Rx-zone length (distribution): 1600 m (400-400-400-400 m) | | | | | | |
| C1 | 150/none | 290/290/290/290 | 2500 | none | 30/30/30/30 | 3040 |
| C2 | 150/none | 290/290/290/290 | 2500 | $1^{st}$ | 148/30/30/30 | 3120 |
| C3 | 150/none | 290/290/290/290 | 2500 | $1^{st}$ | 275/30/30/30 | 3170 |
| IP1 | 150/none | 290/290/290/290 | 2500 | $1^{st}$ | 214/30/30/30 | ~3100 |
| IP2 | 150/none | 290/290/290/290 | 2500 | $1^{st}$ | 214/30/30/30 | ~3100 |
| IP3 | 150/none | 290/290/290/290 | 2500 | $1^{st}$ | 217/30/30/30 | ~3100 |
| IP4 | 150/none | 290/290/290/290 | 2500 | $1^{st}$ | 402/30/30/30 | ~3100 |
| Comparative Polymerization (CP) 4 and Inventive Polymerization (IP) 5, 6: Ethylene feed distribution 50/35/15; Inside tube diameter 40-60-60 mm and Rx-zone length (distribution): 1600 m (500-600-400-500 m) | | | | | | |
| C4 | 150/50 | 290/290/290 | 2500 | no | 30/30/30 | 3360 |
| IP5 | 150/50 | 290/290/290 | 2500 | $1^{st}$, $2^{nd}$ and $3^{rd}$ | 200/94/47 | ~3300 |
| IP6 | 150/50 | 290/290/290 | 2500 | $2^{nd}$ and $3^{rd}$ | 30/178/78 | ~3300 |
| Inventive Polymerizations (IP) 7-9: Ethylene feed distribution: 50/50/0/0; Inside tube diameter 40-60-60-60 mm and Rx-zone length (distribution): 1600 m (300-500-400-400 m) | | | | | | |
| IP7 | 150/50 | 290/290/290/290 | 2500 | $2^{nd}$ | 30/220/30/30 | ~3300 |
| IP8 | 150/50 | 290/290/290/290 | 2500 | $2^{nd}$ | 30/220/30/30 | ~3300 |
| IP9 | 150/50 | 290/290/290/290 | 2500 | $2^{nd}$ | 30/220/30/30 | ~3300 |
| Comparative Polymerization (CP) 5 and Inventive Polymerization (IP) 10: Ethylene distribution 25/25/50/0; Inside tube diameter 30-40-60-60 mm and Rx-zone length (distribution): 1600 m (200-300-600-500 m) | | | | | | |
| C5 | 150/50 | 290/290/290/290 | 2500 | none | 30/30/30/30 | 3195 |
| IP10 | 150/50 | 290/290/290/290 | 2500 | $3^{rd}$ | 30/30/215/30 | ~3100 |

Figure 4:
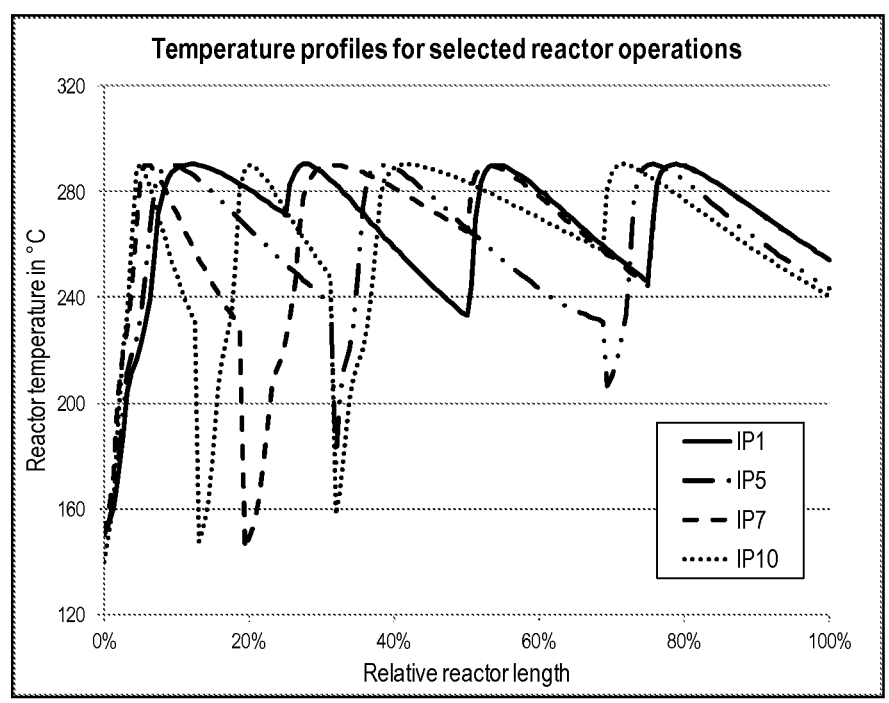
FIG. 4 depicts reactor temperature profiles for selected simulated ethylene distributions.

The reactor temperature profiles are given in FIG. 4. In this figure, all reaction zones have one cooling section; however, multiple cooling sections, with counter- or co-current heat transfer media, operating at differentiated inlet temperatures, may be used.

Different cooling and/or heating media can be applied for the reactor cooling and/or preheating sections. The cooling/heating media comprise water, pressurized water (temperaagent and carbon monoxide distributions show the concentration of added component, in mole ppm, in the cumulative ethylene feed. The last column "% Branching" shows the predicted conversion level of incorporated rheology modifying agent to T- and/or H-branches. Branch formation includes inter- and intra-molecular H-branches and/or T-branches.

TABLE 8

Levels of RMA and CO, and Predicted Conversion Levels

| | Branching Agent | Feed conc in Rx-zone inlet | | Conversion | | | |
|---|---|---|---|---|---|---|---|
| Ex. | (BA) type | RMA ppm | CO ppm | Overall % | CO % | BA % | % Branching % |
| C1 | none | 0 | 0 | 32.8 | 0.0 | 0.0 | 0.0 |
| C2 | none | 0 | 3,200/0/0/0 | 31.7 | 98.1 | 0.0 | 0.0 |
| C3 | none | 0 | 6,300/0/0/0 | 31.2 | 97.8 | 0.0 | 0.0 |
| IP1 | RMA1 (asym-acrylate) | 150/0/0/0 | 4,860/0/0/0 | 32.0 | 98.1 | 99.6 | 60.5 |

TABLE 8-continued

Levels of RMA and CO, and Predicted Conversion Levels

| Ex. | Branching Agent (BA) type | Feed conc in Rx-zone inlet RMA ppm | CO ppm | Conversion Overall % | CO % | BA % | % Branching % |
|---|---|---|---|---|---|---|---|
| IP2 | RMA2 or RMA3 (sym bi-acrylate) | 100/0/0 | 4,850/0/0/0 | 31.9 | 98.0 | 99.9 | 98.2 |
| IP3 | (RMA4) Monomeric CTA | 300/0/00 | 4,940/0/0/0 | 32.5 | 98.2 | 99.6 | 60.1 |
| IP4 | RMA1 (asym-acrylate) | 150/0/0 | 9,550/0/0/0 | 31.7 | 98.0 | 99.4 | 58.3 |
| C4 | none | 0 | 0 | 29.4 | 0.0 | 0.0 | 0.0 |
| IP5 | RMA1 (asym-acrylate) | 150/62/22.6 | 4,500/1853/675 | 28.5 | 93.5 | 97.1 | 54.8 |
| IP6 | RMA1 (asym-acrylate) | 150/62/22.6 | 0/3,953/1440 | 28.4 | 85.1 | 96.4 | 54.7 |
| IP7 | RMA1 (asym-acrylate) | 150 | 0/5,000/0/0 | 32.5 | 96.6 | 99.4 | 60.7 |
| IP8 | RMA2 or RMA3 (sym bi-acrylate) | 100 | 0/5,000/0/0 | 32.3 | 96.5 | 99.9 | 97.6 |
| IP9 | RMA4 (monomeric CTA) | 300 | 0/5,050/0/0 | 32.7 | 96.7 | 99.4 | 61.0 |
| C5 | none | 0 | 0 | 31.9 | 0.0 | 0.0 | 0.0 |
| IP10 | RMA1 (asym-acrylate) | 150 | 0/0/4,870/0 | 30.6 | 92.7 | 98.4 | 57.1 |

Discussion of Results

Table 8 shows the simulated levels of functionality arising from CTA, CO as monomer, and long chain and short chain branching in the whole polymer, versus the lowest molecular weight polymer formed in the last reaction zone. Table 7 and 8 demonstrate that the application of the RMA, together with CO as comonomer, results in polymers with unique combination of MWD, rheology and polar functionality, making these polymers, for instance, suitable for coating applications at lower temperatures, and/or with increased adhesion and melt strength at the same application temperature.

Furthermore Table 7 demonstrates clearly that the carbonyl content in the polymer, originating from the use of ketonic and/or aldehydic CTA's, is overwhelmed by the level of carbonyl, originating from the use of CO as comonomer, and that the distribution of CO in the process can be used to influence the carbonyl content inter and intra polyethylene molecules. Feeding CO mainly to the front of the reactor will lead to larger polymer molecules, which internally have large starting backbones rich (high) in CO, while the more "outer long chain branches" formed in the last reaction zones are poor (low) in CO or carbonyl content. Feeding no or minor quantities of CO to the front reaction zones will lead in larger "polymer molecules with outer longer chain branches" rich in CO or carbonyl content. Levels of functionality in the overall polymer are shown in Table 9.

TABLE 9

Levels of functionality in overall Polymer and the lowest molecular weight formed in the last reaction zone.

| | Overall Polymer | | | | Lowest molecular weight in last Rx-zone | | | |
|---|---|---|---|---|---|---|---|---|
| Ex. | CTA (PA) /1000C | CO /1000C | SCB* /1000C | LCB /1000C | SCB* /1000C | LCB /1000C | CTA (PA) /1000C | CO /1000C |
| C1 | 0.4 | 0.0 | 24.4 | 3.6 | 32.4 | 9.4 | 0.46 | 0 |
| C2 | 0.4 | 5.0 | 23.7 | 3.4 | 31.9 | 8.8 | 0.47 | 0.32 |
| C3 | 0.4 | 10.0 | 23.1 | 3.3 | 31.5 | 8.6 | 0.47 | 0.73 |
| IP1 | ~0.4 | 7.5 | 23.5 | 3.4 | 31.9 | 9.0 | ~0.47 | 0.48 |
| IP2 | ~0.4 | 7.5 | 23.4 | 3.4 | 31.7 | 8.9 | ~0.47 | 0.49 |
| IP3 | ~0.4 | 7.5 | 23.5 | 3.4 | 31.9 | 9.1 | ≤0.3 | 0.46 |
| IP4 | ~0.4 | 15.0 | 22.5 | 3.2 | 31.3 | 8.6 | ~0.47 | 1.16 |
| C4 | 0.4 | 0.0 | 23.0 | 3.2 | 31.6 | 8.1 | 0.50 | 0 |
| IP5 | ~0.4 | 7.5 | 22.5 | 3.0 | 31.0 | 7.6 | ~0.5 | 1.61 |
| IP6 | ~0.4 | 7.5 | 22.3 | 3.0 | 30.9 | 7.6 | ~0.5 | 3.82 |
| IP7 | ~0.4 | 7.5 | 23.0 | 3.5 | 32.3 | 9.4 | ~0.5 | 0.92 |
| IP8 | ~0.4 | 7.5 | 23.0 | 3.5 | 32.4 | 9.3 | ~0.5 | 0.94 |
| IP9 | ~0.4 | 7.5 | 23.0 | 3.5 | 32.3 | 9.4 | ~0.5 | 0.9 |
| C5 | 0.4 | 0.0 | 23.6 | 3.6 | 32.6 | 9.2 | 0.49 | 0 |
| IP10 | ~0.4 | 7.5 | 22.6 | 3.4 | 31.8 | 8.6 | ~0.5 | 1.98 |

*ethyl/butyl branches by backbiting; polymers prepared in the absence of propylene or other olefinic CTAs Comparative Polymerizations 1-3 and Inventive Polymerizations 1-4

As shown in Tables 7-9, the Comparative Examples C1 to C3 show the impact of increasing CO level on the carbonyl content in the whole polymer and in the low molecular weight fraction. The CO will be inhomogeneously distributed over the polymer, as can be seen from the CO level in the polymer with the lowest molecular weight, due to feeding the CO to the front of the reactor. The polymers produced in C1 to C3 will each have a low melt strength level, due to an insufficient level of LCB in the polymer. IP1 to IP3 show that ethylene-carbon monoxide copolymer production can be combined with the use of different types of rheology modifying agents, in order to enhance rheological properties, like melt strength.

IP 5 and IP 6 show that the CO distribution in the polymer can be varied, and enhanced, by distributing the ethylene feeds over the reactor, and furthermore by distributing the CO over the ethylene feed streams. IP 7 to IP 9 shows good CO incorporation level, while the MWD is broadened, and the melt strength can be enhanced, by application of various types of RMAs. The CO distribution in the polymer (inter and intra-molecular) can be varied, by varying the distribution of CO comonomer over both ethylene feed streams. IP10 shows a process configuration with three ethylene feed streams and four reaction zones. This reactor configuration, potentially extended with more Rx-zones, allows very flexible and efficient distribution of RMA and CO comonomer.

SUMMARY

Carbon monoxide is a polar and potentially cheap comonomer; however it is also known as a difficult comonomer to handle in a high pressure, free radical polymerization process, due to its strongly varying overall propagation rate, by the alternating copolymerization mechanism. This strongly varying overall propagation rate, combined with poor heat transfer, requires tubular process operation at significantly reduced maximum temperatures. Operation at reduced peak temperatures limits the capability to produce broader MWD resins with higher melt strength.

Figure 5:
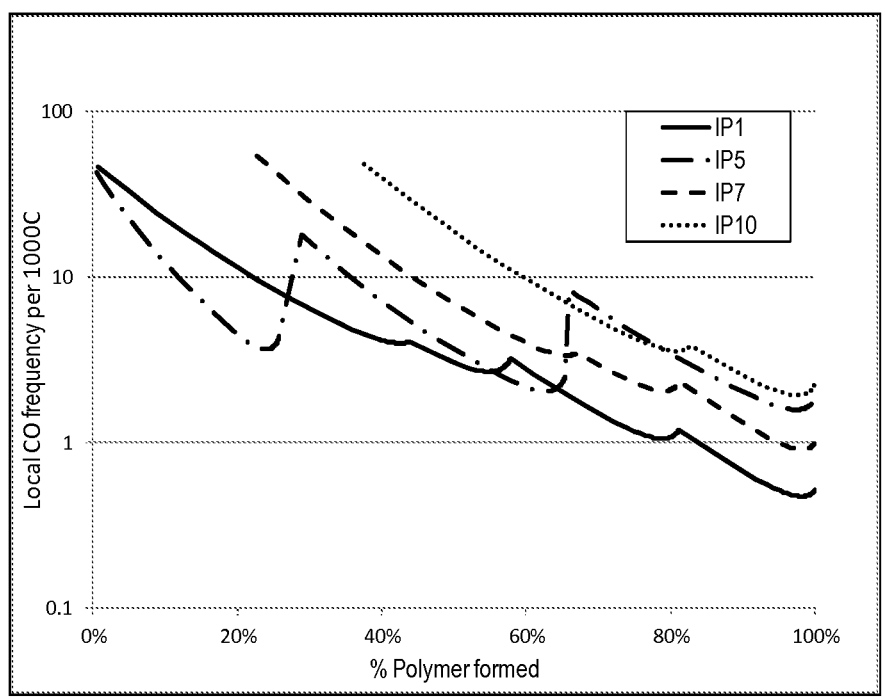
FIG. 5 depicts the local CO frequency per 1000 C as a function of the percent polymer formed along a tubular reactor for selected process scenarios.

Surprisingly, it has been found that broad MWD and high melt strength ethylene-carbon monoxide copolymers can be made by simultaneous application of a rheology modifying agent. Furthermore, it has been found that processes operating with an ethylene distribution are very efficient in distributing rheology modifying agents more to the front of the reactor, by which reaction of multiple functional groups and T- and/or H-branch formation is promoted, while CO can be distributed more to the middle and/or the back of the reactor. The reaction zones in the middle and back of the reactor have a higher degree of long chain branching, by which the CO is better distributed over more molecules (inter-molecular) and over the molecular structure of larger molecules (intra-molecular resulting in higher levels of CO in the outer spheres of larger polymer molecules). FIG. 5 shows that the total carbonyl content of the polymer made close to the reactor outlet can be increased by more than a factor 2, going from IP1 to IP10 process configuration and operating conditions, for the same amount of CO incorporated into the polymer. The combination of broad MWD, high melt strength, high carbonyl level and low extractable level, by lower applied tubular polymerization temperature makes the final polymer very suitable for extrusion coating applications.

The high starting level carbonyl reduces/eliminates the need for oxidative high temperature extrusion, a typical standard process applied with conventional LDPE extrusion coating resins, to meet the required adhesion level and have good melt strength. The oxidative extrusion step affects the taste and odor performance of the product in coating applications, and gives rise to the formation of additional low molecular weight species.

Although the invention has been described in considerable detail in the preceding examples, this detail is for the purpose of illustration, and is not to be construed as a limitation on the invention as described in the following claims. Furthermore, the invention can be combined with other process elements, like ethylene and CTA make up feed distributions, CTA selection, etc., with respect to further enhancement of product properties, including gel content, MWD and/or density.

The invention claimed is:

1. A composition comprising an ethylene-based polymer, comprising at least the following:

A) a unit derived from Carbon Monoxide (CO); and

B) a unit derived from at least one Rheology Modifying Agent (RMA) selected from the following i) through vi):

i) RMA 1:

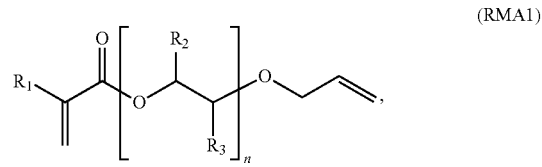

wherein, for RMA1, $R_1$ is H or alkyl, n is from 1 to 50, $R_2$ is selected from H or an alkyl, $R_3$ is selected from H or an alkyl;

ii) RMA2:

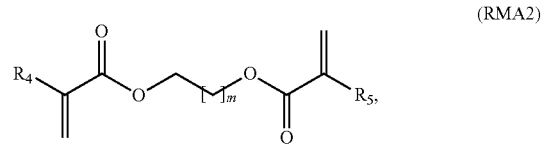

wherein, for RMA2, R4 and R5 are each independently H or an alkyl, m is from 1 to 50;

iii) RMA3:

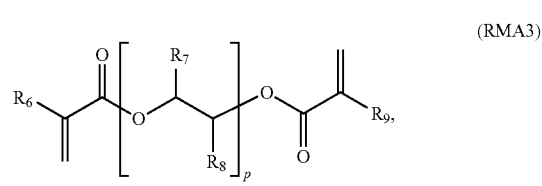

wherein, for RMA3, $R_6$ and $R_9$ are each independently H or an alkyl, p is from 1 to 50;

$R_7$ is selected from H or an alkyl, $R_8$ is selected from H or an alkyl;

iv) RMA4:

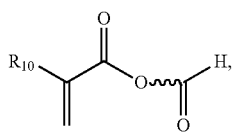
(RMA4)

wherein $R_{10}$ is hydrogen or an alkyl,
the notation "∼∼" is a hydrocarbon chain comprising from 2 to 50 carbon atoms, and wherein the hydrocarbon chain is linear, branched, or comprises a saturated hydrocarbon ring structure;

v) RMA5

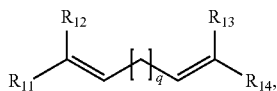
(RMA5)

wherein q is from 2 to 20; R11 is selected from H or alkyl; R12 is selected from H or alkyl; R13 is selected from H or alkyl; R14 is selected from H or alkyl; or vi) any combination of i) through v).

2. The composition of claim 1, wherein the ethylene-based polymer is formed using at least one free-radical initiator, and at a pressure greater than, or equal to, 100 MPa.

3. The composition of claim 1, wherein the polymer has a melt index (I2) less than, or equal to, 30 g/10 min.

4. The composition of claim 1, wherein the polymer comprises carbonyl groups (—C(O)—) at an amount greater than, or equal to, 1 carbonyl per 1000 total carbons.

5. The composition of claim 1, wherein the ratio of the "overall carbonyl content in the polymer" to the "overall carbonyl content in the soluble ethylene-based polymer after hexane extraction" as determined by the Hexane Extractable method, is greater than or equal to, 1.5.

6. The composition of claim 1, wherein the ethylene-based polymer has a density from 0.912 to 0.950 g/cc.

7. The composition of claim 1, wherein the ethylene-based polymer has a melt index (b) from 0.5 to 30 g/10 min.

8. The composition of claim 1, wherein the ethylene-based polymer comprises Carbon Monoxide (CO), and comprising at least one Rheology Modifying Agent that has been effectively incorporated into the polymer.

9. The composition of claim 1, wherein the ethylene-based polymer is prepared in a reactor configuration comprising at least one tubular reactor.

10. The composition of claim 1, further comprising a second ethylene-based polymer that differs in one or more properties from the ethylene-based polymer.

11. An article comprising at least one component formed from the composition of claim 1.

12. The article of claim 11, wherein the article is a film or a coating.

13. The article of claim 11, wherein the article is a coating for a cable or wire.

14. The article of claim 11, wherein the article is a coated sheet.

15. The composition of claim 1, wherein the ethylene-based polymer comprises a unit derived from RMA1.

16. A composition comprising an ethylene-based polymer, comprising at least the following:
A) a unit derived from Carbon Monoxide (CO); and
B) a unit derived from at least one Rheology Modifying Agent (RMA) selected from the following i) through v):
i) RMA2:

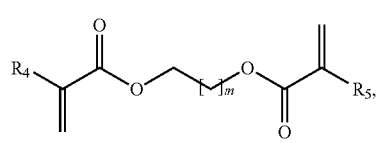
(RMA2)

wherein, for RMA2, R4 and R5 are each independently H or an alkyl,
m is from 1 to 50;

ii) RMA3:

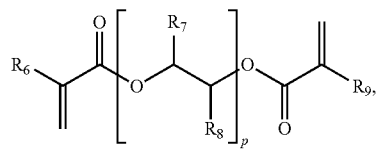
(RMA3)

wherein, for RMA3, $R_6$ and $R_9$ are each independently H or an alkyl,
p is from 1 to 50;
$R_7$ is selected from H or an alkyl,
$R_8$ is selected from H or an alkyl;

iii) RMA4:

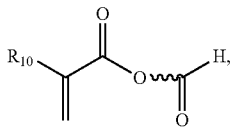
(RMA4)

wherein $R_{10}$ is hydrogen or an alkyl,
the notation "∼∼" is a hydrocarbon chain comprising from 2 to 50 carbon atoms, and wherein the hydrocarbon chain is linear, branched, or comprises a saturated hydrocarbon ring structure;

iv) RMA5

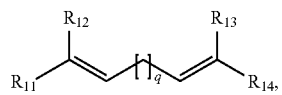
(RMA5)

wherein q is from 2 to 20; R11 is selected from H or alkyl; R12 is selected from H or alkyl; R13 is selected from H or alkyl; R14 is selected from H or alkyl; or v) any combination of i) through iv).

17. The composition of claim 16, wherein the ethylene-based polymer comprises a unit derived from RMA2.

18. The composition of claim 16, wherein the ethylene-based polymer comprises a unit derived from RMA3.

19. The composition of claim 16, wherein the ethylene-based polymer comprises a unit derived from RMA4.

20. The composition of claim 16, wherein the ethylene-based polymer comprises a unit derived from RMA5.

* * * * *

UNITED STATES PATENT AND TRADEMARK OFFICE
CERTIFICATE OF CORRECTION

PATENT NO. : 10,654,955 B2
APPLICATION NO. : 15/311452
DATED : May 19, 2020
INVENTOR(S) : John O. Osby et al.

Page 1 of 1

It is certified that error appears in the above-identified patent and that said Letters Patent is hereby corrected as shown below:

In the Claims

Column 34, Line 48, Claim 1:
"wherein, for RMA2, R4 and R5 are each independently"
Should read:
--wherein, for RMA2, $R_4$ and $R_5$ are each independently--.

Column 35, Line 47, Claim 7:
"based polymer has a melt index (b) from 0.5 to 30g/10 min."
Should read:
--based polymer has a melt index ($I_2$) from 0.5 to 30g/10 min.--.

Column 36, Line 17, Claim 16:
"wherein, for RMA2, R4 and R5 are each independently"
Should read:
--wherein, for RMA2, $R_4$ and $R_5$ are each independently--.

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*